US012103831B2

(12) United States Patent
Belley et al.

(10) Patent No.: US 12,103,831 B2
(45) Date of Patent: Oct. 1, 2024

(54) HEAVY MACHINERY LIFTING APPARATUS, HEAVY MACHINERY LIFTING ASSEMBLY AND METHOD FOR ASSEMBLING A LIFT FOR HEAVY MACHINERY

(71) Applicant: 8082464 CANADA INC., Québec (CA)

(72) Inventors: Robin Belley, Quebec (CA); Charles-Étienne Bienvenu, Quebec (CA); Patrick Sylvestre, Quebec (CA)

(73) Assignee: 8082464 CANADA INC., Quebec (CA)

( * ) Notice: Subject to any disclaimer, the term of this patent is extended or adjusted under 35 U.S.C. 154(b) by 429 days.

(21) Appl. No.: 17/295,594

(22) PCT Filed: Nov. 19, 2019

(86) PCT No.: PCT/CA2019/051648
§ 371 (c)(1),
(2) Date: May 20, 2021

(87) PCT Pub. No.: WO2020/102890
PCT Pub. Date: May 28, 2020

(65) Prior Publication Data
US 2022/0048745 A1 Feb. 17, 2022

Related U.S. Application Data

(60) Provisional application No. 62/770,877, filed on Nov. 23, 2018.

(51) Int. Cl.
*B66F 7/20* (2006.01)
*B66F 3/46* (2006.01)
*B66F 7/28* (2006.01)

(52) U.S. Cl.
CPC .................. *B66F 7/20* (2013.01); *B66F 3/46* (2013.01); *B66F 7/28* (2013.01)

(58) Field of Classification Search
CPC ...... B66F 7/20; B66F 7/10; B66F 7/28; B66F 3/46; B66C 23/80; B66C 5/02
(Continued)

(56) References Cited

U.S. PATENT DOCUMENTS 3,117,652 A 1/1964 Wallace
4,406,386 A * 9/1983 Rasor ...................... B60R 9/045
224/325
(Continued)

FOREIGN PATENT DOCUMENTS

CL 200302430 2/2018
CL 1311-2021 5/2022
(Continued)

OTHER PUBLICATIONS

Heavy Vehicle Lifting Apparatus And Method; Document ID: AU 2015358246 A1; Date Published: Jun. 1, 2017; Inventor Name: Belley Christian, Belley Robin; Date Filed: Dec. 1, 2015 (Year: 2017).*

*Primary Examiner* — Mahdi H Nejad
(74) *Attorney, Agent, or Firm* — Dorton & Willis LLP; Ryan Willis

(57) ABSTRACT

The present disclosure concerns a lifting apparatus for lifting heavy machinery, comprising first and second spaced-apart lifting devices vertically extendable, each lifting device comprising a beam-receiving portion; and a transverse lifting beam comprising a beam body engageable with a portion of the heavy machinery, and first and second opposed mounting end portions removably engageable with the beam-receiving portions, for the transverse lifting beam to extend between the lifting devices. Each beam-receiving portion comprises one of a male connector and a female connector and each mounting end portion comprises the other one of a male connector and a female connector detachably engageable to the one of a male connector and a
(Continued)

female connector of the corresponding beam-receiving portion. The present disclosure also concerns a kit for forming such a lifting apparatus, a lifting assembly comprising at least first and second lifting apparatuses and a method for lifting heavy machinery.

14 Claims, 14 Drawing Sheets

(58) Field of Classification Search
USPC ............. 211/46, 94.01, 162; 248/228.1, 239, 248/297.21
See application file for complete search history.

(56) References Cited

U.S. PATENT DOCUMENTS

| | | | | | |
|---|---|---|---|---|---|
| 4,901,965 | A * | 2/1990 | Bowman | A47B 57/56 248/246 |
| 5,299,658 | A * | 4/1994 | Cox | B66F 7/04 187/209 |
| 5,937,972 | A * | 8/1999 | Andre | B60P 1/02 187/210 |
| 6,705,595 | B2 * | 3/2004 | Belley | E02F 9/003 254/108 |
| 6,845,848 | B1 * | 1/2005 | Kritzer | B66F 7/28 187/221 |
| 9,527,707 | B1 * | 12/2016 | Fehringer | B66D 3/04 |
| 9,751,737 | B2 * | 9/2017 | Taylor | B66F 7/28 |
| 9,796,568 | B1 * | 10/2017 | Gonzales | F16M 11/32 |
| 9,902,599 | B1 * | 2/2018 | Veresko | B66F 7/10 |
| 10,239,737 | B1 * | 3/2019 | Nickerson, III | B66F 7/20 |
| 10,737,921 | B2 * | 8/2020 | Motley | B66C 19/00 |
| 11,242,204 | B1 * | 2/2022 | Zsido | B66F 3/46 |
| 11,479,452 | B2 * | 10/2022 | Schwartz | B66F 7/02 |
| 2002/0017637 | A1 * | 2/2002 | Belley | E02F 9/003 254/89 H |
| 2002/0043137 | A1 * | 4/2002 | Yeo | B25J 9/042 82/112 |
| 2009/0026430 | A1 * | 1/2009 | McDonald | E04G 23/065 254/93 R |
| 2010/0213429 | A1 * | 8/2010 | Drake | B60S 9/08 254/89 R |
| 2015/0232311 | A1 * | 8/2015 | Taylor | B66F 7/28 254/89 R |
| 2020/0198945 | A1 * | 6/2020 | Kolenc | E02F 9/085 |
| 2023/0090066 | A1 * | 3/2023 | Wyble | B66C 7/08 212/324 |

FOREIGN PATENT DOCUMENTS

| | | | | | |
|---|---|---|---|---|---|
| CN | 104276527 | A * | 1/2015 | B66F 7/20 |
| CN | 108100933 | A * | 6/2018 | |
| CN | 110304579 | A * | 10/2019 | B66F 7/20 |
| CN | 213294577 | U * | 5/2021 | |
| KR | 100423731 | B1 * | 2/2003 | |
| KR | 20120031470 | A * | 4/2012 | |

* cited by examiner

HEAVY MACHINERY LIFTING APPARATUS, HEAVY MACHINERY LIFTING ASSEMBLY AND METHOD FOR ASSEMBLING A LIFT FOR HEAVY MACHINERY

CROSS-REFERENCE TO RELATED APPLICATIONS

The present application is a national stage of PCT/CA2019/051648, filed Nov. 19, 2019, which claims priority from U.S. provisional patent application No. 62/770,877, filed on Nov. 23, 2018, and entitled "HEAVY MACHINERY LIFTING APPARATUS AND METHOD", the disclosure of which being hereby incorporated by reference in its entirety.

TECHNICAL FIELD

The technical field relates to lifting heavy equipment, and more particularly to a heavy machinery lifting apparatus, to a heavy machinery lifting assembly and a method for assembling a lift for heavy machinery.

BACKGROUND

Maintenance and repair of heavy machinery, such as mechanical shovels, excavators and trucks, require that the heavy machinery be lifted, for maintenance crews to access a lower portion of the heavy machinery so as to perform maintenance and repairs, and save time and effort by avoiding having to dismantle the heavy machinery.

However, conventional lifting apparatuses are often cumbersome, so that they can hardly be transported from one site to another.

In view of the above, there is a need for heavy machinery lifting apparatus which would be able to overcome or at least minimize some of the above-discussed prior art concerns.

BRIEF SUMMARY

It is therefore an aim of the present invention to address the above-mentioned issues.

According to a general aspect, there is provided a lifting apparatus for lifting heavy machinery. The lifting apparatus comprises first and second lifting devices vertically extendable and spaced-apart from each other, each of the first and second lifting devices comprising a beam-receiving portion; and a transverse lifting beam comprising: a beam body engageable with a portion of the heavy machinery; and first and second opposed mounting end portions removably engageable with the beam-receiving portions of the first and second lifting devices, for the transverse lifting beam to extend between said first and second lifting devices. Each beam-receiving portion comprises one of a male connector and a female connector and each of the first and second mounting end portions of the transverse lifting beam comprises the other one of a male connector and a female connector detachably engageable to said one of a male connector and a female connector of the corresponding beam-receiving portion.

According to another general aspect, there is provided a lifting apparatus for lifting heavy machinery. The lifting apparatus comprises first and second lifting devices vertically extendable and spaced-apart from each other, each of the first and second lifting devices comprising a beam-receiving portion; and a transverse lifting beam comprising: a beam body engageable with a portion of the heavy machinery; and first and second opposed mounting end portions removably engageable with the beam-receiving portions of the first and second lifting devices, for the transverse lifting beam to extend between said first and second lifting devices. Each of the first and second mounting end portions comprises at least two vertically spaced-apart abutting portions detachably engageable with the corresponding beam-receiving portion when mounted thereto.

According to another general aspect, there is provided a lifting apparatus for lifting heavy machinery. The lifting apparatus comprises first and second lifting devices vertically extendable and spaced-apart from each other, each of the first and second lifting devices comprising a beam-receiving portion; and a transverse lifting beam comprising: a beam body engageable with a portion of the heavy machinery; and first and second opposed mounting end portions removably engageable with the beam-receiving portions of the first and second lifting devices, for the transverse lifting beam to extend between said first and second lifting devices. Each beam-receiving portion comprises at least two spaced-apart bearing surfaces, the first and second mounting end portions of the transverse lifting beam being engageable with the corresponding one of the at least two spaced-apart bearing surfaces to prevent each of the first and second mounting end portions from tilting with respect to the corresponding one of the first and second lifting devices when mounted thereto.

According to another general aspect, there is provided a lifting assembly comprising at least first and second lifting apparatuses according to the present disclosure.

According to another general aspect, there is provided a method for assembling a lift for heavy machinery. The method comprises providing first and second lifting devices vertically extendable and comprising a beam-receiving portion and a transverse lifting beam comprising a beam body and first and second opposed mounting end portions, wherein each beam-receiving portion comprises one of a male connector and a female connector and each of the first and second mounting end portions of the transverse lifting beam comprises the other one of a male connector and a female connector; positioning the first and second lifting devices on the ground in a spaced-apart configuration; and engaging the first and second mounting end portions of the transverse lifting beam with the beam-receiving portions of the first and second lifting devices.

According to another general aspect, there is provided a lifting apparatus for lifting heavy machinery. The lifting apparatus comprises first and second lifting devices vertically extendable and spaced-apart from each other, each of the first and second lifting devices comprising a beam-receiving portion, and a transverse lifting beam having a lifting body engageable with a portion of the heavy machinery and first and second opposed mounting end portions removably engageable with the beam-receiving portions of the first and second lifting devices, for the transverse lifting beam to extend between said first and second lifting devices. Each beam-receiving portion comprises at least two spaced-apart bearing surfaces engageable with the corresponding one of the first and second mounting end portions to prevent each of the first and second mounting end portions from tilting with respect to the corresponding one of the first and second lifting devices when mounted thereto.

According to another general aspect, there is provided a lifting apparatus for lifting heavy machinery. The lifting apparatus comprises first and second lifting devices vertically extendable and spaced-apart from each other, each of the first and second lifting devices comprising a beam-receiving portion, and a transverse lifting beam having a lifting body engageable with a portion of the heavy machinery and first and second opposed mounting end portions removably engageable with the beam-receiving portions of the first and second lifting devices, for the transverse lifting beam to extend between said first and second lifting devices. Each of the first and second mounting end portions comprises at least two vertically spaced-apart abutting portions engageable with the corresponding beam-receiving portion when mounted thereto.

According to another general aspect, there is provided a lifting apparatus for lifting heavy machinery, the lifting apparatus comprises first and second lifting devices vertically extendable and spaced-apart from each other, each of the first and second lifting devices comprising a beam-receiving portion, and a transverse lifting beam having a lifting body engageable with a portion of the heavy machinery and first and second opposed mounting end portions removably engageable with the beam-receiving portions of the first and second lifting devices, for the transverse lifting beam to extend between said first and second lifting devices. Each beam-receiving portion comprises one of a male connector and a female connector and each beam-receiving portion comprises the other one of a male connector and a female connector detachably engageable to said one of a male connector and a female connector of the corresponding beam-receiving portion.

According to another general aspect, there is provided a kit for forming a lifting apparatus according to the present disclosure.

According to yet another general aspect, there is provided a method for lifting heavy machinery from a ground surface. The method comprises providing a kit according to the present disclosure, positioning the first and second supplementary mounting bases on the ground surface, mounting the first and second lifting devices to the first and second supplementary mounting bases, engaging the first and second mounting end portions of the transverse lifting beam with the beam-receiving portions of the first and second lifting devices, and extending the first and second lifting devices for the lifting body of the lifting beam to engage and lift the heavy machinery.

DETAILED DESCRIPTION

Figure 1A:
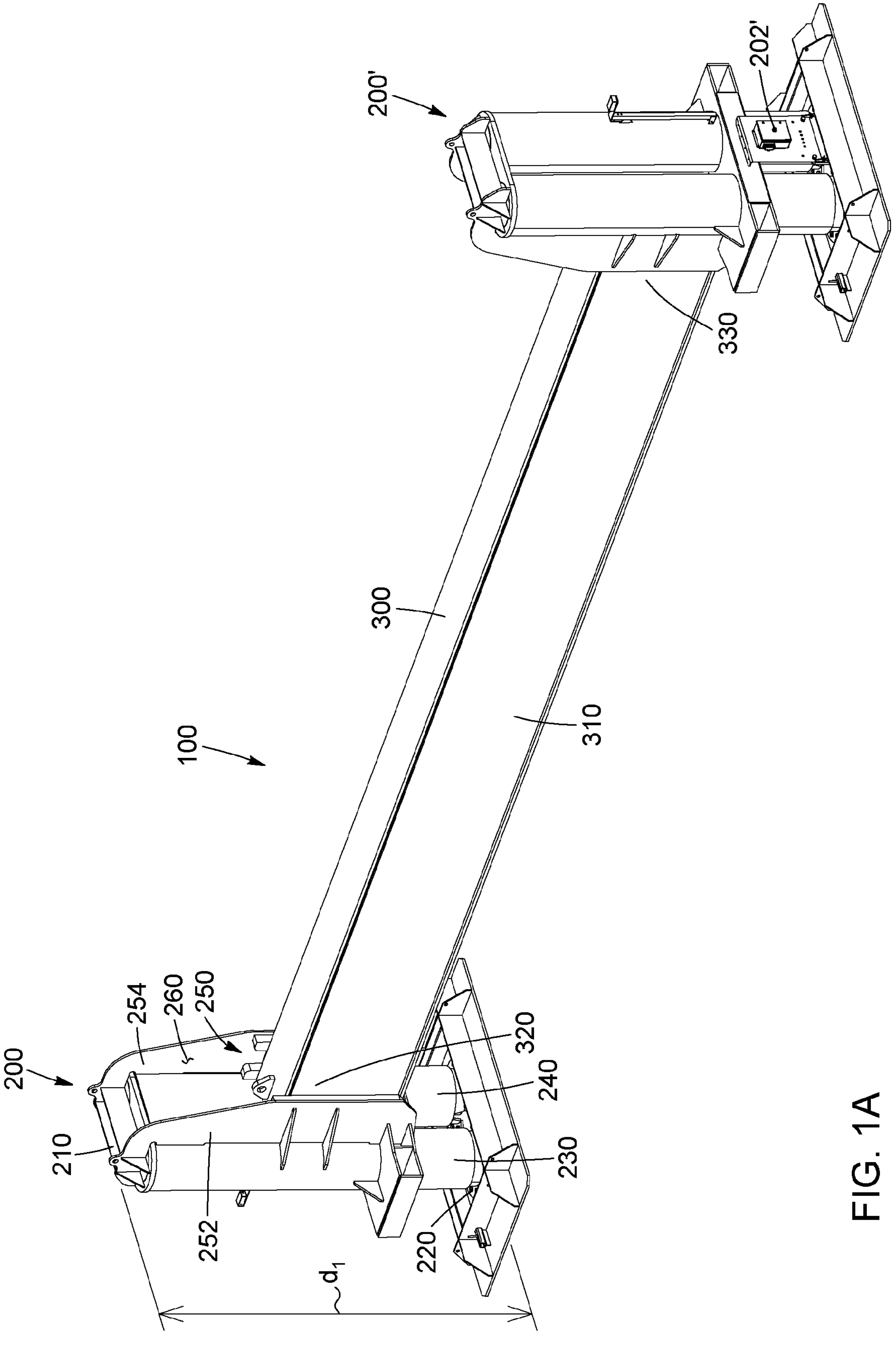
FIG. 1A is a top perspective view of a heavy machinery lifting apparatus in accordance with an embodiment, the lifting apparatus comprising a transverse lifting beam extending between and removably mounted to first and second lifting devices, the lifting apparatus being configured in a lowered configuration.

In the following description, the same numerical references refer to similar elements. Furthermore, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional and are given for exemplification purposes only.

Moreover, it will be appreciated that positional descriptions such as "above", "below", "forward", "rearward", "left", "right" and the like should, unless otherwise indicated, be taken in the context of the figures only and should not be considered limiting. Moreover, the figures are meant to be illustrative of certain characteristics of the lifting apparatus and are not necessarily to scale.

To provide a more concise description, some of the quantitative expressions given herein may be qualified with the term "about". It is understood that whether the term "about" is used explicitly or not, every quantity given herein is meant to refer to an actual given value, and it is also meant to refer to the approximation to such given value that would reasonably be inferred based on the ordinary skill in the art, including approximations due to the experimental and/or measurement conditions for such given value.

In the following description, an embodiment is an example or implementation. The various appearances of "one embodiment", "an embodiment" or "some embodiments" do not necessarily all refer to the same embodiments. Although various features may be described in the context of a single embodiment, the features may also be provided separately or in any suitable combination. Conversely, although the invention may be described herein in the context of separate embodiments for clarity, it may also be implemented in a single embodiment. Reference in the specification to "some embodiments", "an embodiment", "one embodiment" or "other embodiments" means that a particular feature, structure, or characteristic described in connection with the embodiments is included in at least some embodiments, but not necessarily all embodiments.

It is to be understood that the phraseology and terminology employed herein is not to be construed as limiting and are for descriptive purpose only. The principles and uses of the teachings of the present disclosure may be better understood with reference to the accompanying description, figures and examples. It is to be understood that the details set forth herein do not construe a limitation to an application of the disclosure.

Furthermore, it is to be understood that the disclosure can be carried out or practiced in various ways and that the disclosure can be implemented in embodiments other than the ones outlined in the description above. It is to be understood that the terms “including”, “comprising”, and grammatical variants thereof do not preclude the addition of one or more components, features, steps, or integers or groups thereof and that the terms are to be construed as specifying components, features, steps or integers. If the specification or claims refer to “an additional” element, that does not preclude there being more than one of the additional element. It is to be understood that where the claims or specification refer to “a” or “an” element, such reference is not be construed that there is only one of that element. It is to be understood that where the specification states that a component, feature, structure, or characteristic “may”, “might”, “can” or “could” be included, that particular component, feature, structure, or characteristic is not required to be included.

The descriptions, examples, methods and materials presented in the claims and the specification are not to be construed as limiting but rather as illustrative only. Meanings of technical and scientific terms used herein are to be commonly understood as by one of ordinary skill in the art to which the invention belongs, unless otherwise defined. It will be appreciated that the methods described herein may be performed in the described order, or in any suitable order.

Referring now to the drawings, and more particularly to FIGS. 1A to 5, there is shown a lifting apparatus 100 in accordance with a first embodiment. The lifting apparatus 100 is configured to lift heavy machinery (not represented), for instance and without being limitative, mechanical shovels, excavators and trucks, for instance for maintenance and/or repair purposes.

The lifting apparatus 100 comprises first and second spaced-apart lifting devices 200, 200' vertically extendable and spaced-apart from each other. Each one of the first and second lifting devices 200, 200' comprises a beam-receiving portion 250, 250'. The lifting apparatus 100 further comprises a transverse lifting beam 300 having a lifting beam body 310 (or beam body 310) engageable with a lower portion of the heavy machinery and first and second opposed mounting end portions 320, 330 removably engageable with the beam-receiving portions 250, 250' of the first and second lifting devices 200, 200'. When engaged with the first and second lifting devices 200, 200', the transverse lifting beam 300 extends in between.

As described below, each of the first and second lifting devices 200, 200'—and more particularly their corresponding beam-receiving portions 250, 250'—comprises at least two vertically spaced-apart bearing/abutting surfaces 280, 282 (FIG. 4) (or bearing/abutting portions 280, 282) engageable with the corresponding one of the first and second opposed mounting end portions 320, 330 of the transverse lifting beam 300 to prevent the lifting beam 300 from pivoting with respect to each of the first and second lifting devices 200, 200' when mounted thereto. In the embodiment shown, each beam-receiving portion 250, 250' comprises, as detailed below, a male connector engageable with a female connector of a corresponding one of the first and second opposed mounting end portions 320, 330 of the transverse lifting beam 300.

First and Second Lifting Devices

In the embodiment shown, the first and second lifting devices 200, 200' have a similar shape, so that the following description of the first lifting device 200 will also apply to the second lifting device 200'. It could however also be conceived a lifting apparatus having different first and second lifting devices.

Figure 1B:
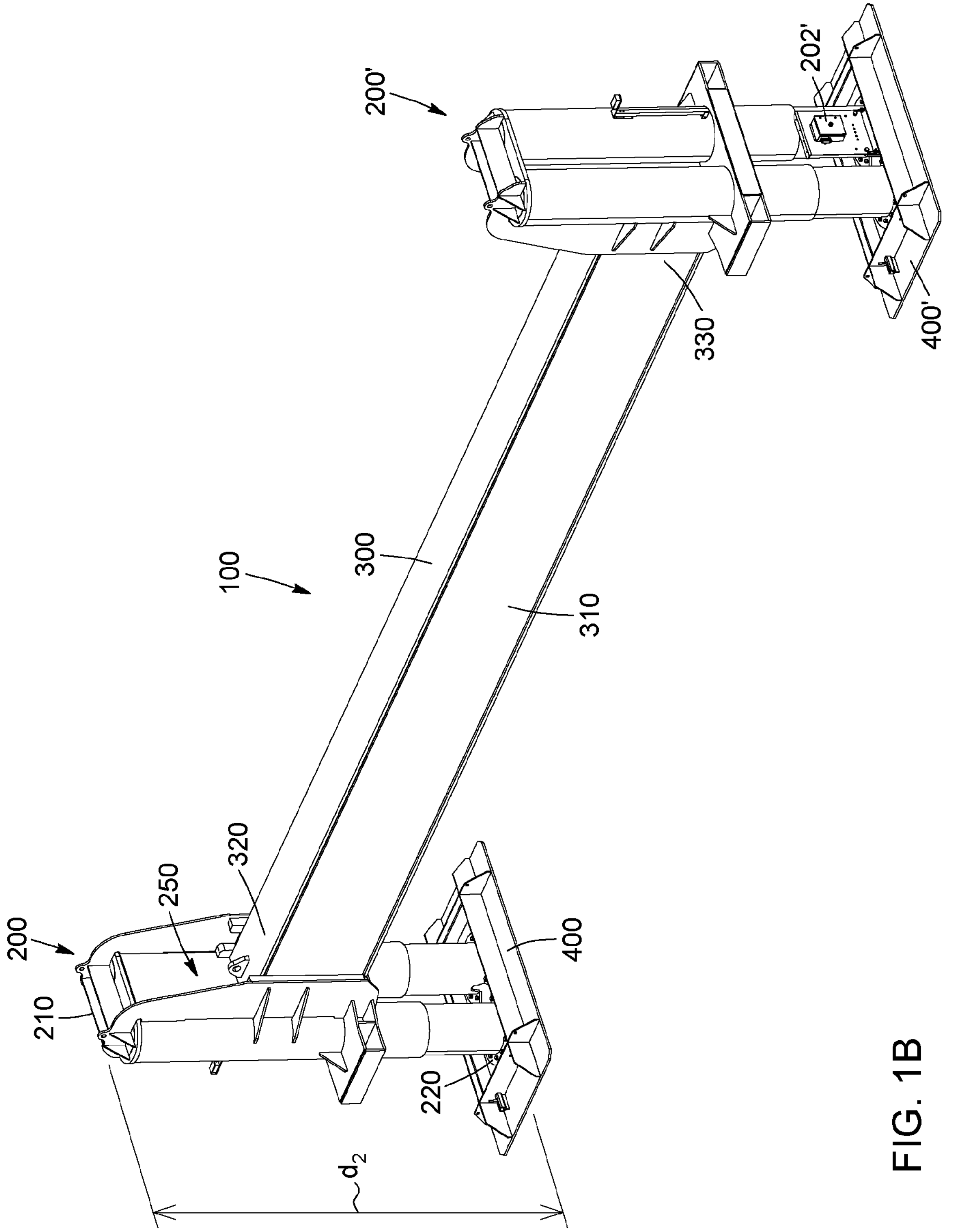
FIG. 1B is a top perspective view of the lifting apparatus of FIG. 1A being configured in an extended configuration.

The first lifting device 200 extends substantially vertically in the embodiment shown and is vertically extendable. In other words, the first lifting device 200 has an upper portion 210 and an opposed lower portion 220, a length defined by a combination of the upper and lower portions 210, 220 being adjustable. In other words, the first lifting device 200 is configurable into a lowered configuration, as represented in FIG. 1A, and into a raised or extended configuration, as represented in FIG. 1B. The length d1 defined by the combination of the upper and lower portions 210, 220 when the first lifting device 200 is configured in the lowered configuration is smaller than the length d2 defined by the combination of the upper and lower portions 210, 220 when the first lifting device 200 is configured in the extended configuration. The first lifting device 200 is also configurable into a plurality of configurations corresponding to a plurality of lengths defined by the combination of the upper and lower portions comprised between the lengths d1 and d2 represented respectively in FIGS. 1A and 1B.

For instance, the length d1 in the lowered configuration is less than about 90% of the length d2 in the extended configuration. In another embodiment, the length d1 in the lowered configuration is less than about 80% of the length d2 in the extended configuration. In another embodiment, the length d1 in the lowered configuration is less than about 70% of the length d2 in the extended configuration. In yet another embodiment, the length d1 in the lowered configuration is less than about 50% of the length d2 in the extended configuration.

Figure 4:
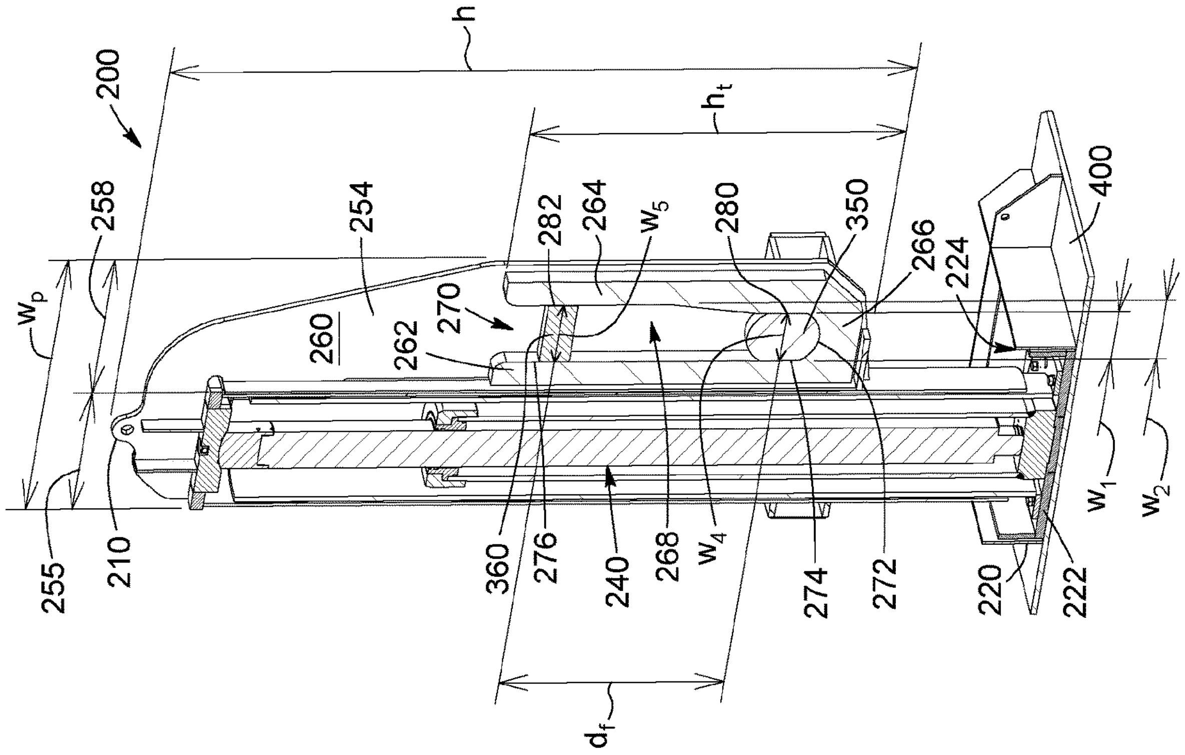
FIG. 4 is a cross-section view of the first lifting device of FIG. 1A, with a mounting end portion of the lifting beam engaged therewith.

In the embodiment shown, and as represented in FIGS. 1A, 1B and 4, the first lifting device 200 comprises first and second hydraulic cylinders 230, 240 configured in an adjacent configuration. The first lifting device 200 might further comprise a controller (controller 202', represented in FIG. 1A with respect to the second lifting device 200') operatively coupled to the first and second hydraulic cylinders 230, 240 and designed for providing command signals thereto so as to simultaneously extend or retract the first and second hydraulic cylinders 230, 240, for the first lifting device 200 to be configured in one of the plurality of vertical extended configurations. The first and second lifting devices 200, 200' might comprise two distinct controllers, or a single controller configured to simultaneously extend or retract the different hydraulic cylinders of the first and second lifting devices 200, 200'.

Figure 2:
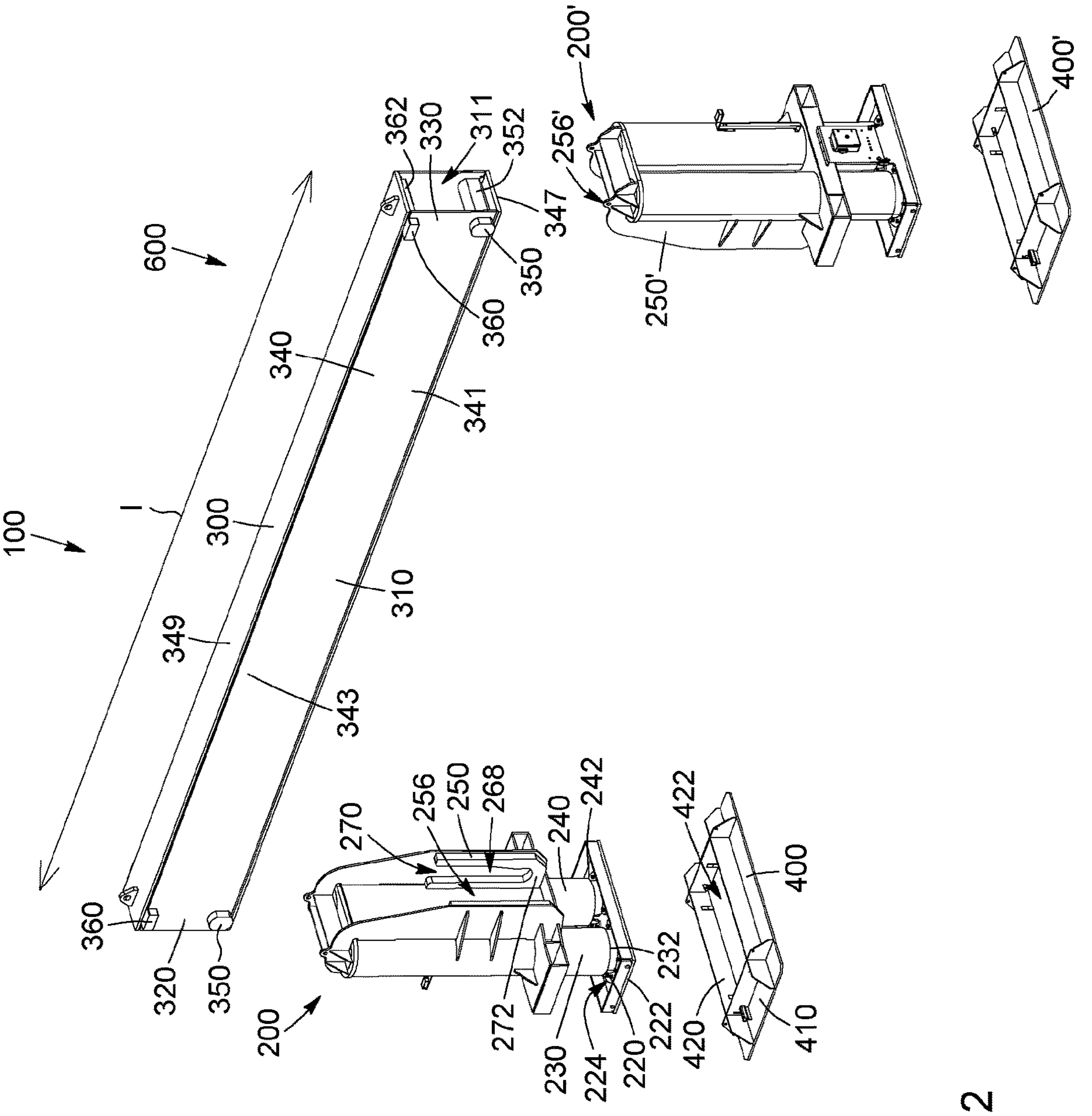
FIG. 2 is a top perspective view, exploded, of the lifting apparatus of FIG. 1A.

Referring to FIG. 2, there is shown that the lower portion 220 of the first lifting device 200 comprises lower ends 232, 242 (or cylinder lower end portions) of the first and second hydraulic cylinders 230, 240 and a base 222 comprising, in the embodiment shown, a cylinder receiving receptacle 224 to which the lower ends 232, 242 (or cylinder lower end portions 232, 242) of the first and second hydraulic cylinders 230, 240 are engaged and secured.

It is appreciated that the shape, the configuration, the number and the location of the first and second hydraulic cylinders 230, 240 can vary from the embodiment shown. It is also appreciated that the shape and configuration of the base 222 can vary from the embodiment shown.

The first lifting device 200 further comprises the above-mentioned beam-receiving portion 250 extending, in the embodiment shown, along a section of the first and second hydraulic cylinders 230, 240. The beam-receiving portion 250 comprises a beam-receiving cavity 256 facing a similar beam-receiving cavity 256' of the second lifting device 200', when the first and second lifting devices 200, 200' are spaced-apart from each other for the lifting beam 300 to be mounted thereto and therebetween.

Beam-Receiving Portion

In the embodiment shown, the beam-receiving portion 250 comprises first and second horizontally spaced-apart and vertically extending beam-supporting plates 252, 254. In the embodiment shown, the first and second beam-supporting plates 252, 254 extend substantially parallel to each other. The beam-receiving cavity 256 is defined therebetween and is at least partially delimited by the beam-supporting plates 252, 254.

In the embodiment shown, the first and second beam-supporting plates 252, 254 have a similar shape, so that the following description of the second beam-supporting plate 254, represented for instance in FIG. 4, will also apply to the first beam-supporting plate 252.

Along its width wp, as represented in FIG. 4, the second beam-supporting plate 254 can be divided into a cylinder edge region 255 mounted to, in the embodiment shown, one of the first and second hydraulic cylinders 230, 240 and an opposed beam edge region 258, which is part of the beam-receiving portion 250 of the lifting device 200. The cylinder edge region 255 of the beam-supporting plate 254 is mounted to one of the first and second hydraulic cylinders 230, 240 by welding, through mechanical fasteners, or a combination thereof. Moreover, the second beam-supporting plate 254 has an inner face 260 facing an inner face 261 of the first beam-supporting plate 252 and partially delimiting the beam-receiving cavity 256. Unless otherwise stated, the terms inner and outer should be understood with respect to the beam-receiving cavity 256 defined by the beam-receiving portion 250 and partially delimited by the first and second beam-supporting plates 252, 254.

In the embodiment shown, the beam-receiving portion 250 of the lifting device 200 further comprises first and second guiding rails 262, 264 spaced-apart from each other and extending substantially vertically along a height h of the second beam-supporting plate 254, as represented in FIG. 4.

The first and second guiding rails 262, 264 are mounted, such as by welding, through mechanical fasteners, or a combination thereof, to the inner face 260 of the second beam-supporting plate 254. The first and second guiding rails 262, 264 are joined together at their lower end portions by a beam bearing portion 266.

A beam engagement track 268 is formed between the first and second guiding rails 262, 264. In other words, the first beam-supporting plate 252 defines the beam engagement track 268. The beam engagement track 268 extends along at least a portion of the height h of the beam-supporting plate 264. In the embodiment shown, a height ht of the beam engagement track 268 is shorter than about 90% of the height h of the beam-supporting plate 264. In another embodiment, the height ht of the beam engagement track 268 is shorter than about 80% of the height of the beam-supporting plate 264. In another embodiment, the height ht of the beam engagement track 268 is shorter than about 70% of the height of the beam-supporting plate 264. In yet another embodiment, the height ht of the beam engagement track 268 is shorter than about 60% of the height of the beam-supporting plate 264.

The beam engagement track 268 has an open upper end 270 (or beam-introducing portion 270 or beam-introducing end 270) and a closed lower end 272 (or seat portion 272) delimited by the lower end portions of the first and second guiding rails 262, 264 and by the beam bearing portion 266. The inner surface (considered with regards to the beam engagement track 268) of the beam bearing portion 266 forms the lower end 272 of the beam engagement track 268/closes the beam engagement track 268, at the lower end 272 thereof, and defines a first one of the bearing/abutting surfaces 280 of the first lifting device 200. A second one of the bearing/abutting surfaces 282 of the first lifting device 200, vertically spaced-apart from the first bearing surface 280, is defined by a section of the inner surfaces of the first and second guiding rails 262, 264.

As represented in FIG. 4, the beam engagement track 268 has a width—considered in a substantially horizontal direction in the embodiment shown—that decreases, considered along the height ht of the beam-engagement track 268, from the beam-introducing portion 270 towards the seat portion 272. In the embodiment shown, the beam engagement track 268 has a lower section 274 with a cross-section w1 that is narrower than a cross-section w2 of an upper section 276 of the beam engagement track 268. In other words, the first and second guiding rails 262, 264 converge towards each other along the height ht of the beam-engagement track 268 from the beam-introducing portion 270 towards the seat portion 272.

It is appreciated that the shape, the configuration, and the location of the beam-receiving portion 250, as well as the shape, the configuration and the location of the beam engagement track 268 and the first and second beam supporting plates 252, 254 can vary from the embodiment shown. For instance, the present disclosure is not limited to a beam-engagement track 268 that would be at least partially delimited by first and second spaced-apart guiding rails protruding inwardly (considered with respect to the beam-receiving cavity) from the inner face 260 of the second beam-supporting plate 254. It could also be conceived, for instance, a beam-engagement slot that would be formed in the inner face 260 so as to define the beam-engagement track. Moreover, the present disclosure is not limited to a beam-engagement track delimited by guiding rails extending continuously along the height ht of the beam-engagement track 268. It could also be conceived a beam-engagement track that would be delimited by guiding rails that would comprise vertically spaced-apart portions (i.e. in which vertically spaced-apart segments would form discontinuous and/or interrupted guiding rails).

Figure 6:
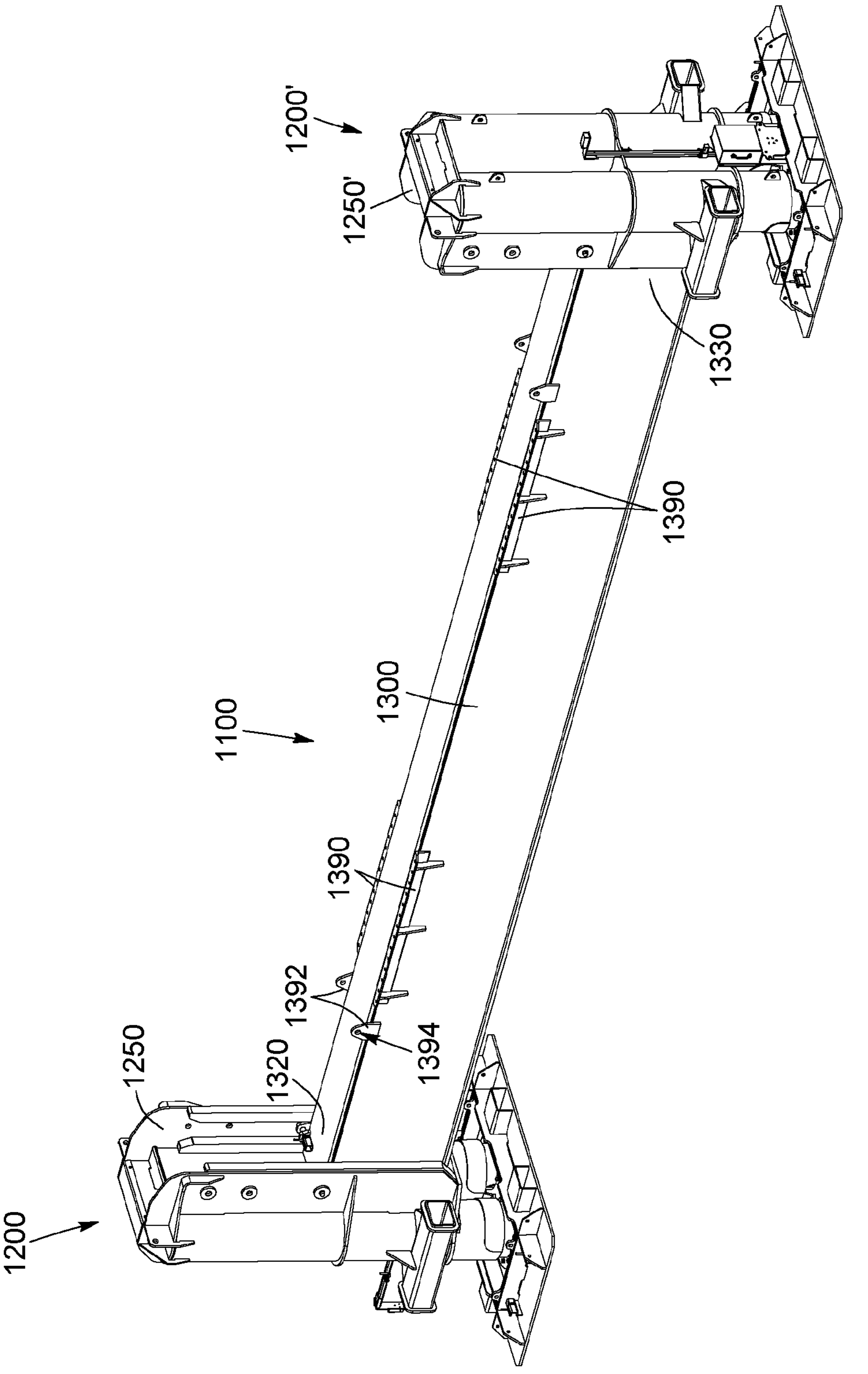
FIG. 6 is a top perspective view of a heavy machinery lifting apparatus in accordance with another embodiment.
Figure 7:
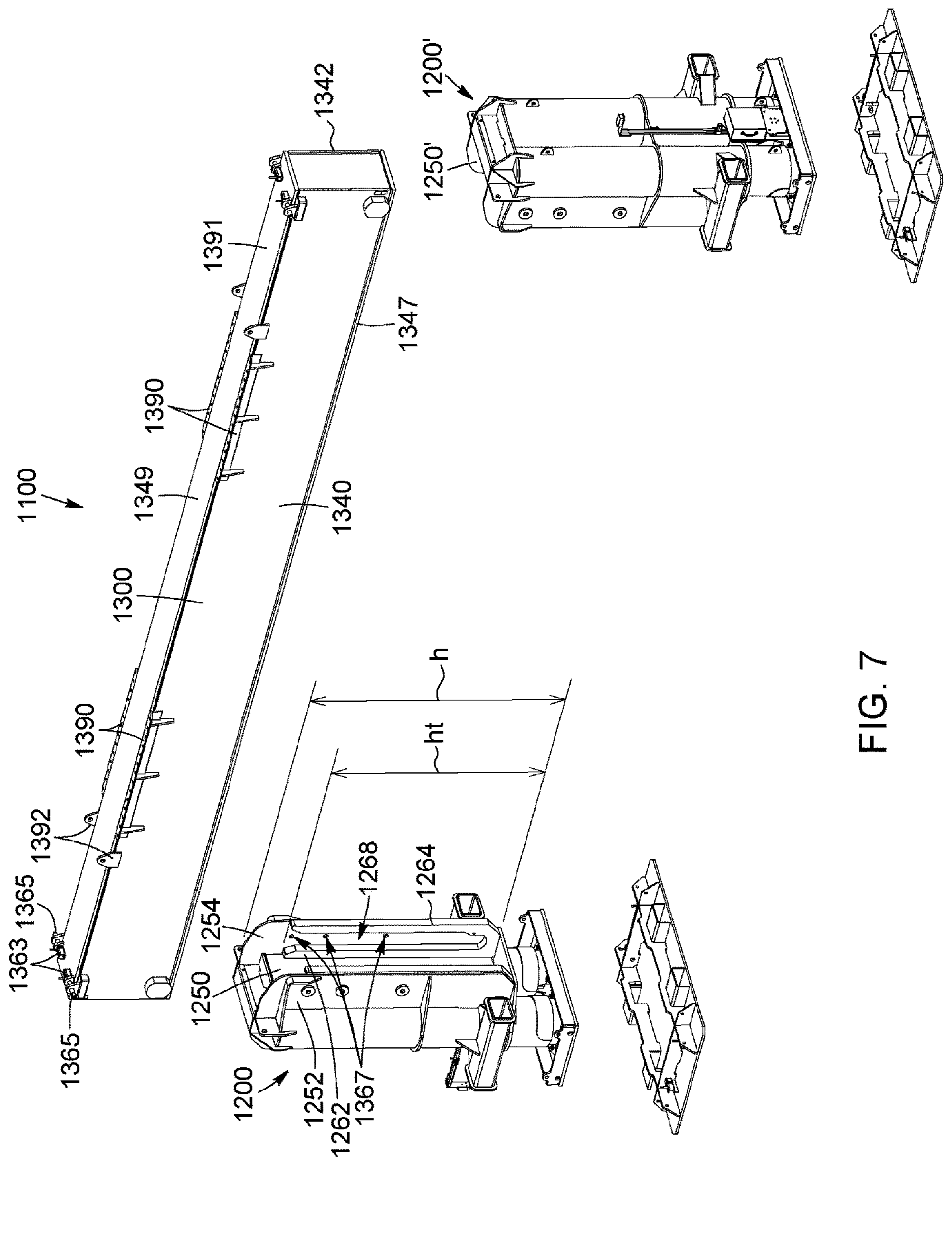
FIG. 7 is a top perspective view, exploded, of the lifting apparatus of FIG. 6.
Figure 8:
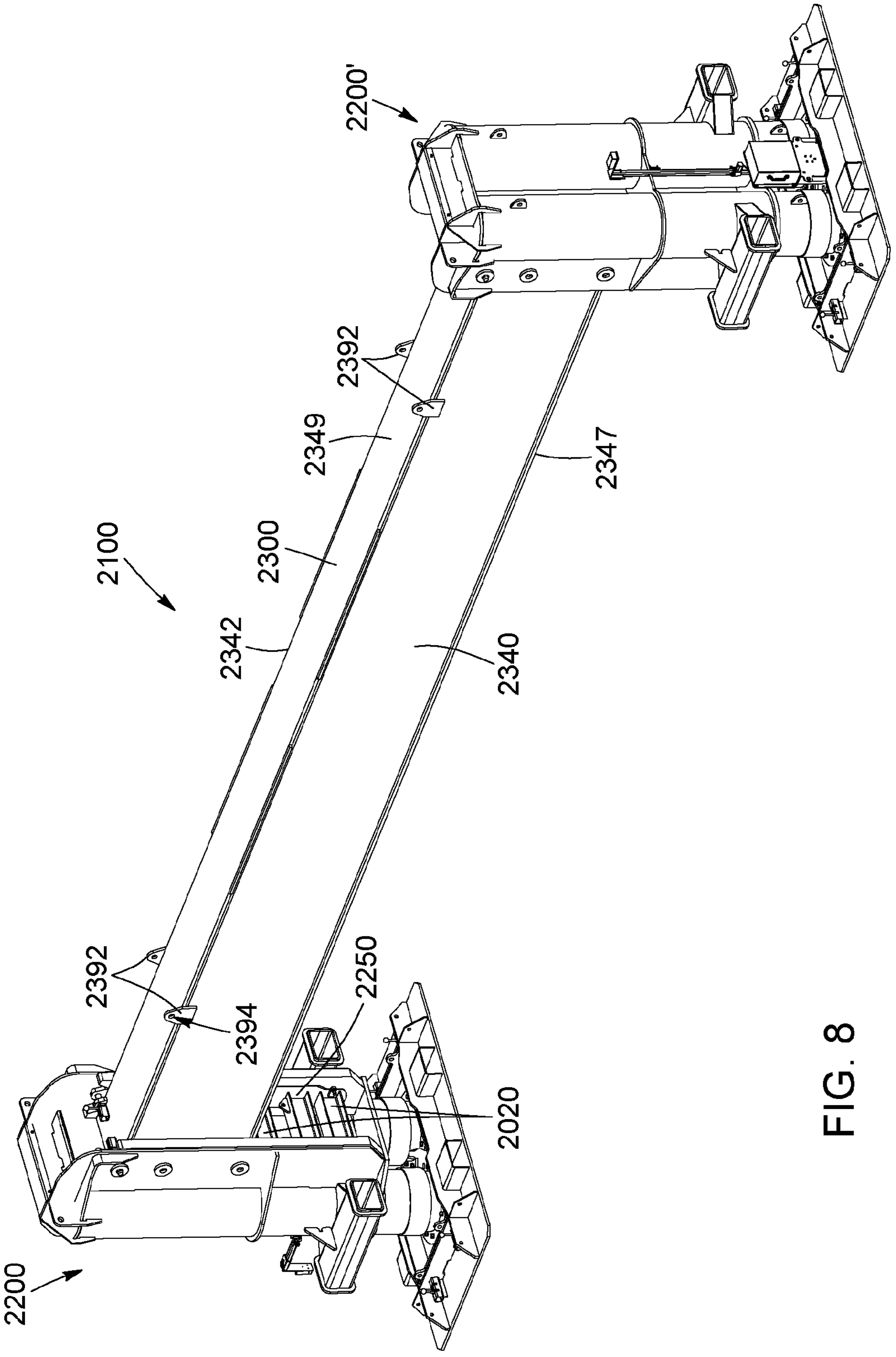
FIG. 8 is a top perspective view of a heavy machinery lifting apparatus in accordance with another embodiment, the first and second lifting devices comprising a plurality of spacers engaged therewith.

It could also be conceived a beam-engagement track having different dimensions. For instance, as shown in FIGS. 6 and 7 that represent a second embodiment of the lifting apparatus 1100 comprising first and second lifting devices 1200, 1200' and a transverse lifting beam 1300 having first and second opposed mounting ends 1320, 1330. As represented in FIG. 7, similarly to the first embodiment of the lifting apparatus 100, a beam engagement track 1268 is formed between first and second guiding rails 1262, 1264. The beam engagement track 1268 of the second embodiment of the lifting apparatus 1100 extends along a portion of the height h of the beam-supporting plate 1264 greater than the portion of the height of the beam-supporting plate 264 along which the beam engagement track 268 of the first embodiment of the lifting apparatus 100 extends. In the embodiment shown, the height ht of the beam engagement track 1268 is greater than about 60% of the height h of the beam-supporting plate 1264. In another embodiment, the height ht of the beam engagement track 1268 is greater than about 80% of the height of the beam-supporting plate 1264. In another embodiment, the height ht of the beam engagement track 1268 is greater than about 90% of the height of the beam-supporting plate 1264. In yet another embodiment, the beam engagement track 1268 extends along substantially an entirety of the height h of the beam-supporting plate 1264.

Spacers

As represented in FIGS. 8 to 11, the first lifting device 2200 of the lifting apparatus 2100 in accordance with a third embodiment might further comprise one or more spacers 2020 (three, in the embodiment shown) removably engageable to the beam-receiving portion 2250. In the embodiment shown, the spacers 2020 extend between the first and second beam-supporting plates 2252, 2254. The spacers 2020 are configured and arranged so as to shorten a length of the beam engagement track 2268, considered along the height h of the beam supporting plate 2254, and therefor modify the position of the transverse lifting beam 2300 along the beam-receiving portion 2250 of the lifting device 2200.

In the embodiment shown, the plurality of superposed spacers 2020 have a similar shape, so that the following description of one of the spacers 2020 will apply to any of them.

In the embodiment shown, the spacer 2020 has opposed mounting end portions 2022 (or track-engaging ends 2022) removably engageable respectively with each one of the beam-supporting plates 2252, 2254. The mounting end portions 2022 might be receivable into the beam engagement tracks 2268 formed on each beam-supporting plate 2252, 2254 and might comprise a lower portion 2024 abuttable against the closed lower end 2272 of the corresponding beam engagement track 2268 or abuttable against the track-engaging ends 2022 of a lower and adjacent one of the spacers 2020.

Figure 10:
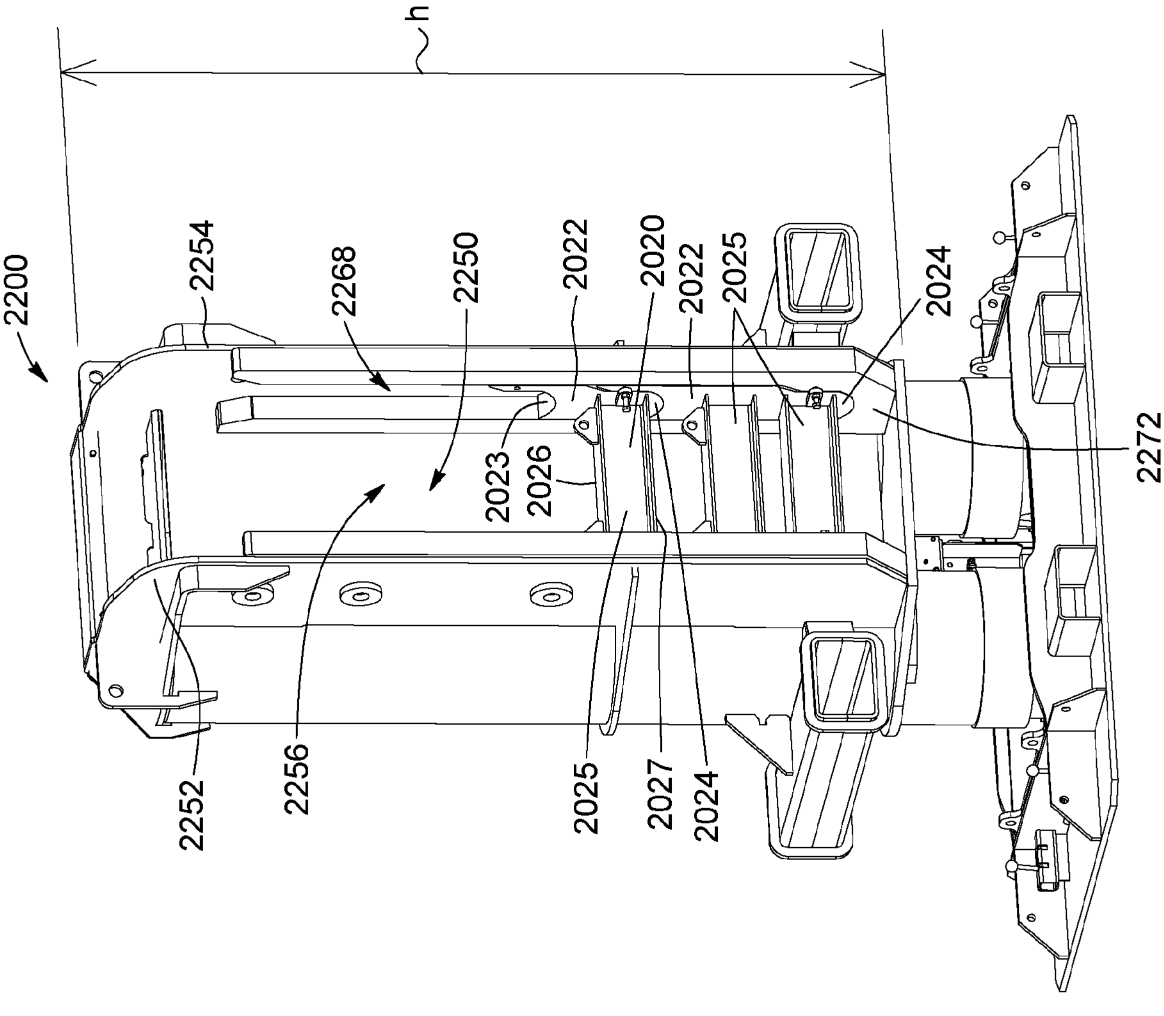
FIG. 10 is an enlarged perspective view of the first lifting device of FIG. 9, with no lifting beam engaged therewith.
Figure 11:
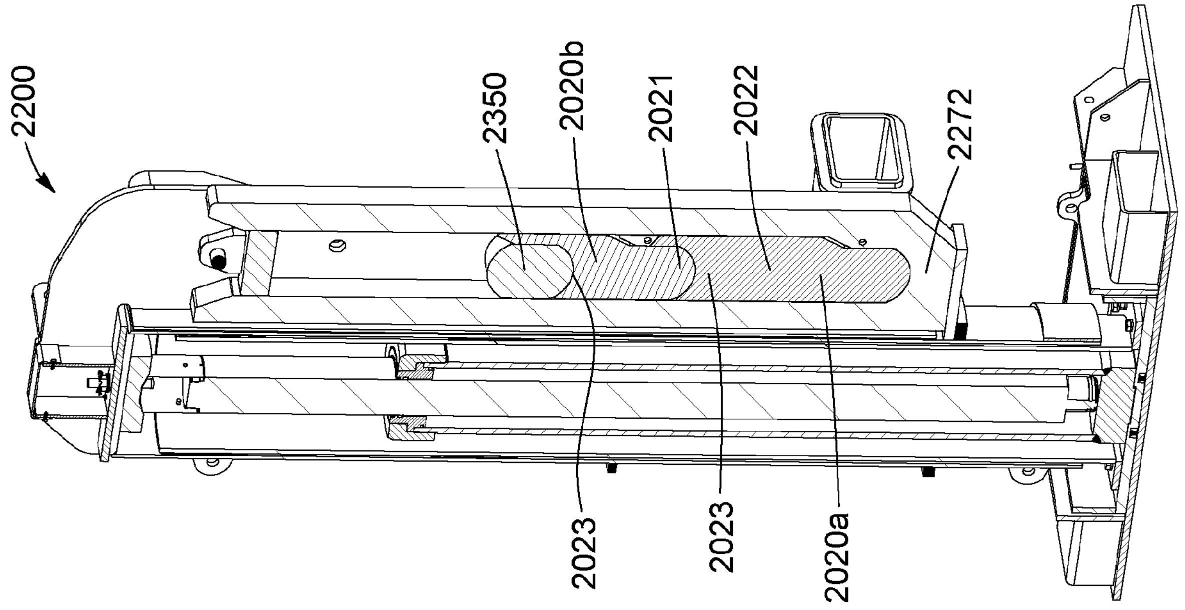
FIG. 11 is a cross-section view of the first lifting device of FIG. 9, with the mounting end portion of the lifting beam engaged therewith.

In the embodiment shown, as represented in FIGS. 10 and 11, the track-engaging ends 2022 have a top portion 2023 defining a concavity substantially similar to a concavity defined by the seat portion 2272. Similarly to the seat portion 2272, and as it will described below, the track-engaging ends 2022 are thus shaped and dimensioned to receive lower abutting fingers 2350 of the mounting end portion of the lifting beam 2300, as will be described in more details below.

In the embodiment shown, the spacer 2020 has a spacing body 2025 extending between the opposed track-engaging ends 2022 and between the first and second beam-supporting plates 2252, 2254 when the spacer 2020 is engaged to the beam-receiving portion 2250. For instance, the spacing body 2025 has a substantially rectangular cross-section, and comprises an upper portion 2026 (or upper face 2026) and a lower portion 2027 (or lower face 2027). In the embodiment shown, the upper and lower faces 2026, 2027 are substantially rectangular and extend substantially parallel to each other between the first and second beam-supporting plates 2252, 2254.

As represented in FIGS. 10 and 11, a plurality of spacers 2020 can be superposed on each other in the beam-receiving cavity 2256 to further shorten the length of the beam engagement track 2268. As represented in FIGS. 10 and 11, two spacing bodies 2022 of a lower spacer 2020*a* are secured to each other at their track-engaging ends 2022. Moreover, the top portion 2023 of the lower spacer 2020*a* defines a concavity corresponding substantially to a convexity of a bottom portion 2021 of the upper spacer 2020*b* so as to contribute to the stability of the superposition of the different spacers 2020. In other words, the track-engaging ends 2022 of the spacers 2020 are shaped and dimensioned to be complementary in shape and substantially fit together when superposed on each other in the beam-receiving cavity 2256.

It is appreciated that the shape, the number, the configuration, and the location of the spacers 2020 with regards to the beam-receiving portion 2250 can vary from the embodiment shown.

Transverse Lifting Beam

Referring back to FIGS. 1A to 4, in the embodiment shown, the transverse lifting beam 300 has a longitudinal direction I and comprises the beam body 310 extending along the longitudinal direction I between the first and second opposed mounting end portions 320, 330.

Figure 3:
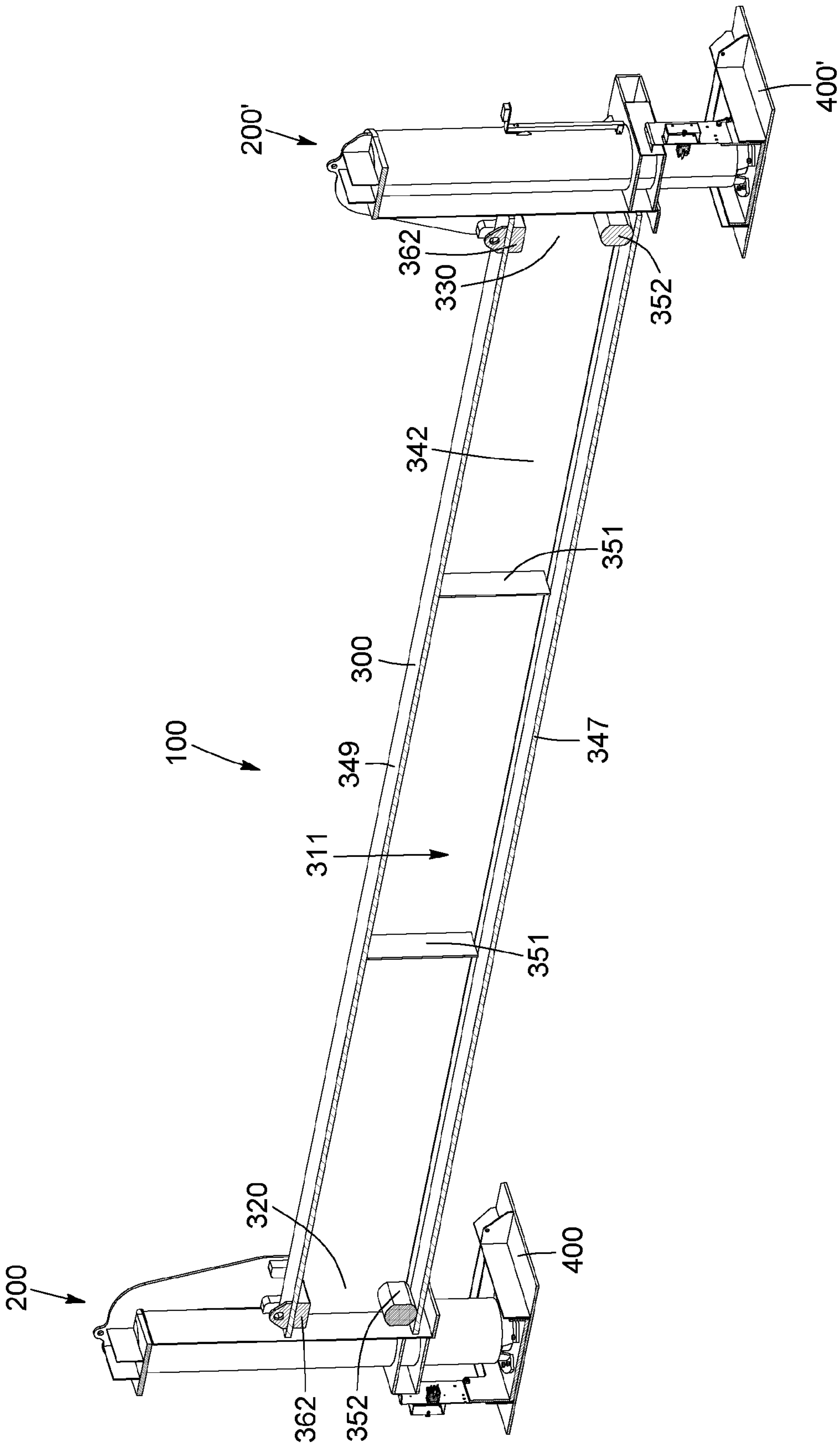
FIG. 3 is a cross section view of the lifting apparatus of FIG. 1A.

In the embodiment shown, the beam body 310 is substantially hollow and defines an inner cavity 311, as represented in FIG. 3.

In the embodiment shown, the transverse lifting beam 300 has first and second side walls 340, 342 spaced-apart from each other and extending substantially vertically. In the embodiment shown, the first and second side walls 340, 342 are substantially rectangular in shape. The transverse lifting beam 300 further comprises spaced-apart bottom and top walls 347, 349, substantially rectangular in shape, substantially parallel to each other and extending between the first and second side walls 340, 342. The lifting beam 300 might further comprise reinforcing members 351 extending in the inner cavity 311 defined by the walls 340, 342, 347, 349 and secured (for instance welded) to one or more of the walls 340, 342, 347, 349.

In the non-limitative embodiment shown, the transverse lifting beam 300 has two vertically extending planes of symmetry: the first plane of symmetry extends along the longitudinal direction I of the lifting beam 300, between the first and second side walls 340, 342 and the second plane of symmetry is perpendicular to the first plane of symmetry.

It is appreciated that the shape and the configuration of the transverse lifting beam 300, and more particularly the shape, the configuration and the location of the first and second mounting end portions 320, 330 and the beam body 310 can vary from the embodiment shown.

With reference to the second embodiment of the lifting apparatus 1100 as represented in FIGS. 6 and 7, the transverse lifting beam 1300 might further comprise one or more heavy machinery-supporting members 1390 secured (for instance welded) to at least one of the walls 1340, 1342, 1347, 1349 of the transverse lifting beam 1300 and shaped and dimensioned so as to increase a heavy machinery-supporting surface 1391 of the lifting beam 1300.

Moreover, with reference to the second and third embodiments of the lifting apparatus 1100, 2100 as represented respectively in FIGS. 6 and 7 and in FIGS. 8 to 11, the transverse lifting beam 1300, 2300 might further comprise one or more cable-mounting tabs 1392, 2392 secured (for instance welded) to at least one of the walls 1340, 1342, 1349, 2340, 2342, 2349 of the transverse lifting beam 1300, 2300 and shaped and dimensioned so as to be mounted to lifting cables (not represented) to lift the assembled lifting apparatus 1100, 2100. For instance, a cable-receiving opening 1394, 2394 is formed in the cable-mounting tabs 1392, 2392 to receive a portion of the lifting cables.

Mounting End Portion

In the embodiment shown, the first and second mounting end portions 320, 330 have a similar shape, so that the following description of the first mounting end portion 320 (i.e. the one engageable with the first lifting device 200) will also apply to the second mounting end portion 330 (i.e. the one engageable with the second lifting device 200').

Moreover, the first mounting end portion 320 having a plane of symmetry extending vertically between the first and second side walls 340, 342 of the transverse lifting beam 300, the following description of the first side wall 340 of the first mounting portion 320 will also apply to the second side wall 342 of the first mounting portion 320.

As represented in FIG. 2, the first mounting end portion 320 comprises a lower abutting bar 352 extending through the inner cavity 311, through the first and second side walls 340, 342 and protruding outwardly (considered with respect to the inner cavity 311) from the first and second side walls 340, 342 in a lower portion 341 of the lifting beam 300. In the non-limitative embodiment shown, the lower abutting bar 352 has a substantially oval cross-section. The portions protruding outwardly from the first and second side walls 340, 342 define the above-mentioned lower abutting guides (or lower abutting fingers) 350 which are sized to be received in the beam engagement track 268, and more particularly to abut against the closed lower end 272 (or seat portion 272) of the beam engagement track 268 when no spacer is engaged to the beam-receiving portion 250. In the embodiment in which the lower abutting finger has a substantially oval cross-section, the seat portion 272 defines a concavity designed and shaped to at least partially receive the lower abutting finger 350. A width w4 of the lower abutting guide 350, considered along the longitudinal direction I of the lifting beam 300, as represented in FIG. 4, is narrower or substantially equal to the cross-section w1 of the lower section 274 of the beam engagement track 268.

The transverse lifting beam 300 might further comprise a blocking member to prevent the lower abutting bar 352 from translating with regards to the first and second side walls 340, 342. In an alternative embodiment, the lower abutting bar 352 can be bonded, such as by welding, to the first and second side walls 340, 342. In another alternative embodiment, the lower abutting fingers 350 protruding from the first and second side walls 340, 342 can be made of two distinct components (i.e. are not necessarily formed by protruding portions of a lower abutting bar). For instance, the lower abutting fingers 350 can be secured (for instance welded or bonded) to the first and second side walls 340, 342 so as to protrude outwardly (considered with respect to the inner cavity 311) thereof.

The first mounting end portion 320 further comprises an upper abutting bar 362 extending through the inner cavity 311, through the first and second side walls 340, 342 and protruding outwardly (with respect to the inner cavity 311) from the first and second side walls 340, 342 in an upper portion 343 of the first side wall 340. In the embodiment shown, the upper abutting bar 362 has a substantially rectangular cross-section. The portions protruding outwardly from the first and second side walls 340, 342 define upper abutting guides (or upper abutting fingers) 360 which are sized to be received in the beam engagement track 268, and more particularly in the upper section 276 of the beam engagement track 268, between the first and second guiding rails 262, 264. As represented in FIG. 4, a width w5 of the upper abutting finger 360, considered along the longitudinal direction I of the lifting beam 300, is narrower or substantially equal to the cross-section w2 of the upper section 276 of the beam engagement track 268. In an embodiment, the upper abutting bar 362 can be bonded, such as by welding, to the first and second side walls 340, 342 so as to prevent the upper abutting bar 362 from translating with regards to the first and second side walls 340, 342. In another alternative embodiment, the upper abutting fingers 360 protruding from the first and second side walls 340, 342 can be made of two distinct components (i.e. are not necessarily formed by protruding portions of an upper abutting bar). For instance, the upper abutting fingers 360 can be secured (for instance welded or bonded) to the first and second side walls 340, 342 so as to protrude outwardly (considered with respect to the inner cavity 311) thereof.

In the embodiment in which the cross-section w1 of the lower section 274 of the beam engagement track 268 is narrower than the cross-section w2 of the upper section 276 of the beam engagement track 268, the width w5 of the upper abutting finger 360 is equal to or greater than the width w4 of the lower abutting finger 350. For instance, the width w4 of the lower abutting finger 350 is smaller than about 95% of the width w5 of the upper abutting finger 360. In another embodiment, the width w4 of the lower abutting finger 350 is smaller than about 90% of the width w5 of the upper abutting finger 360. In another embodiment, the width w4 of the lower abutting finger 350 is smaller than about 85% of the width w5 of the upper abutting finger 360.

In the non-limitative embodiment shown, the upper and lower abutting guides or fingers 360, 350 are thus vertically spaced-apart from each other.

As represented in FIG. 4, the distance df between the upper and lower abutting fingers 350, 360 is smaller than or equal to the height ht of the beam engagement track 268. In some embodiments, the distance df between the upper and lower abutting fingers 350, 360 is smaller than about 95% of the height ht of the beam engagement track 268. In some other embodiments, the distance df between the upper and lower abutting fingers 350, 360 is smaller than about 80% of the height ht of the beam engagement track 268. In some other embodiments, the distance df between the upper and lower abutting fingers 350, 360 is smaller than about 60% of the height ht of the beam engagement track 268. In yet some other embodiments, the distance df between the upper and lower abutting fingers 350, 360 is smaller than about 50% of the height ht of the beam engagement track 268.

It is appreciated that the shape, the configuration, the number and the location of the upper and lower abutting guides or fingers 350, 360 can vary from the embodiment shown.

As represented in FIGS. 6 and 7 with respect to the second embodiment of the lifting apparatus 1100, the transverse lifting beam 1300 might further comprise blocking pieces 1363 (or blockers 1363), for instance secured to the top wall 1349 of the lifting beam 1300, to prevent the transverse lifting beam 1300 from disengaging out of the first and second lifting devices 1200, 1200' (i.e. out of the corresponding beam-receiving portions 1250, 1250'), for instance in the case where the first and second lifting devices 1200, 1200' and the transverse lifting beam 1300 would be lifted together, for instance by a crane with lifting cables secured to the above-mentioned cable-mounting tabs 1392 and applying an up-force to the transverse lifting beam 1300. In other words, the blocking pieces 1363 are configured to lock together the first and second lifting devices 1200, 1200' and the transverse lifting beam 1300, when the first and second mounting end portions of the transverse lifting beam 1300 are engaged with the beam-receiving portions of the first and second lifting devices 1200, 1200', for the first and second lifting devices 1200, 1200' and the transverse lifting beam 1300 to form together one single element, for instance to ease their lifting.

In the embodiment shown, the blocking pieces 1363 are configurable into an unlocked configuration, wherein the transverse lifting beam 1300 can be engaged to and disengaged from the beam-receiving portion 1250 of the first lifting device 1200. The blocking pieces or blockers 1363 are also configurable into a blocking configuration wherein the lifting beam 1300 is prevented from being disengaged from the lifting device 1200. For instance, the blocking piece 1363 comprises a blocking end 1365 engageable into a blocking opening 1367 formed in the corresponding one of the first and second beam-supporting plates 1252, 1254.

In the embodiment shown, a plurality of blocking openings 1367 are formed in the first and second beam-supporting plates 1252, 1254 for the blocking pieces 1363 to be configurable into the blocking configuration when one or more of the above-described spacers are engaged to the beam-receiving portion 1250.

Engagement of the Mounting End Portion with the Beam-Receiving Portion

Returning now to FIGS. 1 to 4, there is shown that the beam-receiving portions 250, 250' of the first and second lifting devices 200, 200' and the first and second mounting end portions 320, 330 of the lifting beam 300 are configured to be removably engageable together to ensure a stable and easy assembling of the lifting apparatus 100.

As represented in FIG. 4, the first and second mounting end portions 320, 330 of the lifting beam 300 are engaged with the beam-receiving portions 250, 250' of the first and second lifting devices 200, 200', for the transverse lifting beam 300 to extend between the first and second lifting devices 200, 200'. More particularly, the lower and the upper abutting guides or fingers 350, 360 are engaged in the beam engagement track 268 and abut respectively the two spaced-apart bearing/abutting surfaces 280, 282 of the beam-receiving portion 250. By being located vertically-spaced apart from one another, the engagement between the lower and the upper abutting guides 350, 360 and the respective bearing/abutting surfaces 280, 282, prevents the assembly including the first and second lifting devices 200, 200' and the transverse lifting beam 300 from tilting, for instance along the longitudinal direction I.

In the embodiment shown, the two bearing/abutting surfaces 280, 282 are vertically spaced apart from each other and are configured to be engaged respectively by the lower and upper abutting guides or fingers 350, 360. The two bearing/abutting surfaces 280, 282 correspond to two spaced-apart positions (vertically spaced-apart, in the embodiment shown) along the assembly including the guiding rails 262, 264 and the beam bearing portion 266 defining the beam engagement track 268.

In other words, the beam-receiving portion 250 comprises at least two distinct bearing/abutting surfaces configured to prevent tilting of the lifting beam 300 when the first and second mounting end portions 320, 330 are engaged in their corresponding beam-receiving portions 250. In yet other words, the upper and lower abutting guides 350, 360 form two vertically spaced-apart abutting portions engageable with the corresponding beam-receiving portion 250.

In other words, the upper and lower abutting guides or fingers 350, 360 form a male connector of the first mounting end portion 320 engageable to an elongated female connector formed by the beam engagement track 268 defined by the beam-receiving portion 250 of the first lifting device 200. In yet other words, in the embodiment shown, the male connector comprises at least two spaced-apart male connectors and the female connector comprises an elongated and vertically extending female connector.

Figure 5:
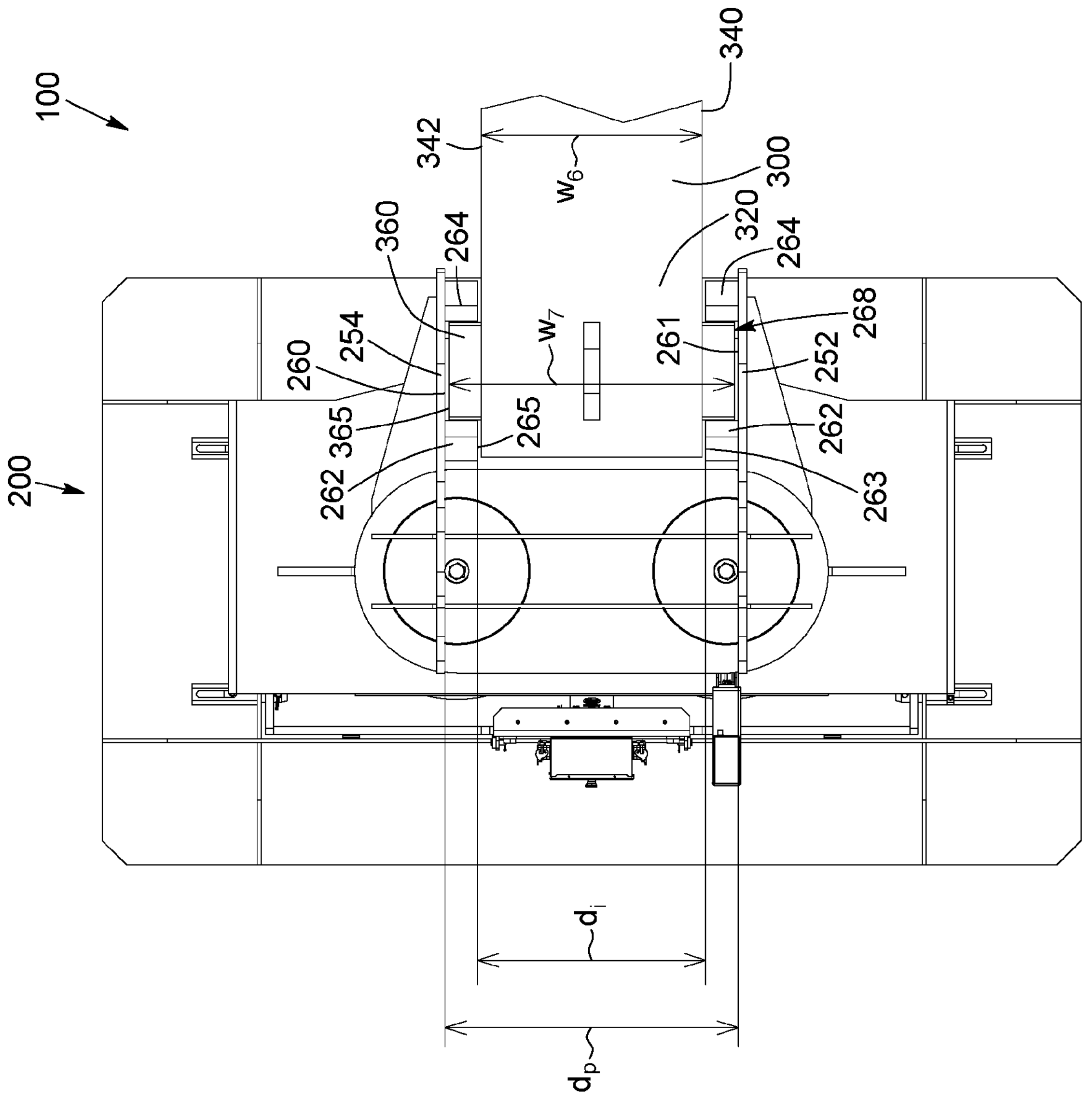
FIG. 5 is top elevation view of the first lifting device of FIG. 1A, with the mounting end portion of the lifting beam engaged therewith.

It is further understood that the lifting beam 300 is dimensioned for its first and second mounting end portions 320, 330 to be removably engageable to the beam-receiving portions 250, 250' of the first and second lifting devices 200, 200'. In particular, as represented in FIG. 5, a distance w6 between the first and second side walls 340, 342 of the lifting beam 300 is smaller than or substantially equal to a distance di between inner faces 263, 265 of the guiding rails 262, 264 of the first beam supporting plate 252 and the second beam supporting plate 254. In other words, the distance w6 between the first and second side walls 340, 342 allows the lifting beam 300 to be introduced between the facing rails 262, 264 of the first and second beam supporting plates 252, 254, for the first and second mounting end portions 320, 330 to be engaged in the beam-receiving portions 250.

Moreover, a distance w7 between free ends 365 of the lower and upper abutting guides or fingers 350, 360 protruding from the first and second side walls 340, 342 is smaller than or substantially equal to a distance dp between the inner faces 260 of the first and second beam-supporting plates 252, 254, and is greater than the distance di between the inner faces 263, 265 of the guiding rails 262, 264 of the first beam-supporting plate 252 and the second beam-supporting plate 254. In other words, the distance w7 between the free ends 365 of the lower and upper abutting fingers/guides 350, 360 protruding from the first and second side walls 340, 342 allows the lower and upper abutting fingers/guides 350, 360 to be introduced in the beam engagement tracks 268 formed on the first and second beam-supporting plates 252, 254, for the lower and upper abutting guides 350, 360 to be maintained in the beam engagement tracks 268 when the first and second mounting end portions 320, 330 are engaged to the beam-receiving portions 250.

It is appreciated that the shape, the configuration, the number and the location of the bearing surfaces 280, 282 can vary from the embodiment shown. For instance, a lifting device 100 with each of the first and second mounting end portions 320, 330 of the lifting beam 300 having a lifting device engagement track formed thereon with an open lower end and a closed upper end to engage abutting guides protruding from the beam-receiving portions 250 of the first and second lifting devices 200, 200' could also be conceived. In such an embodiment, the closed upper end vertically would be abuttable against one of the abutting guides of the beam-receiving portions 250. In other words, it could be conceived a lifting assembly wherein each beam-receiving portion comprises a male connector and each of the first and second mounting end portions of the transverse lifting beam comprises a female connector detachably—or removably—engageable to the male connector of the corresponding beam-receiving portion.

Moreover, mounting end portions 320, 330 having lower and upper abutting guides 350, 360 extending from each other in a continuous manner (i.e. lower and upper abutting guides being formed by lower and upper abutting portions of a single component) could also be conceived.

In the embodiment shown, each of the first and second mounting end portions 320, 330 comprises lower and upper abutting guides/fingers (i.e. vertically spaced-apart abutting portions) protruding outwardly from the first and second side walls 340, 342 of the transverse lifting beam 300. It could also be conceived a mounting end portion having two vertically spaced-apart abutting portions consisting of a lower abutting finger protruding from one of the first and second side walls and an upper abutting finger protruding from the other one of the first and second side walls.

Similarly, in the embodiment shown, each beam-receiving portion comprises vertically spaced-apart bearing surfaces on each of the first and second beam-supporting plates. It could also be conceived a beam-receiving portion having two vertically spaced-apart bearing surfaces consisting of a lower bearing surface defined by one of the first and second beam-supporting plates and an upper bearing surface defined by the other one of the first and second beam-supporting plates.

It could also be conceived a mounting end portion having more than two vertically spaced-apart abutting portions and/or a beam-receiving portion having more than two spaced-apart bearing surfaces.

First and Second Supplementary Supporting Bases

Referring back to FIG. 2, in the embodiment shown, the lifting apparatus 100 further comprises first and second supplementary supporting bases 400, 400' removably securable to the lower portions 220 of the first and second lifting devices 200, 200'.

In the embodiment shown, the first and second supplementary supporting bases 400, 400' have a similar shape, so that the following description of the first supplementary supporting base 400 will also apply to the second supplementary supporting base 400'.

In the embodiment shown, as represented for instance in FIG. 2, the first supplementary supporting base 400 has a supporting plate 410, configured to be positioned on a ground surface, and a lifting device receiving box 420, mounted to the supporting plate 410, and defining a lifting device receiving cavity 422 dimensioned and configured to receive the lower portion 220 (for instance the cylinder-receiving receptacle 224, in the embodiment shown) of the first lifting device 200.

The supporting plate 410 defines a surface area greater than a surface area of the cylinder-receiving receptacle 224, so that the pressure exerted on the ground surface by the first lifting device 200 is reduced with regards to an embodiment in which the cylinder-receiving receptacle 224 would be directly in contact with the ground surface.

It is appreciated that the shape and the configuration of the first supplementary supporting base 400, as well as the shape and the configuration of the supporting plate 410 and the lifting device receiving box 420, can vary from the embodiment shown.

The supplementary supporting bases 400, 400' further comprise a securing assembly to mechanically secure the supplementary supporting bases 400, 400' to the lower portion 220 of the corresponding one of the first and second lifting devices 200, 200'. The securing assembly (not shown) can be embodied by disengageable mechanical fasteners configured to engage and extend simultaneously through portions of the supplementary supporting bases 400, 400' and the lower portions 220 of the first and second lifting devices 200, 200' when engaged together.

Kit for Forming a Lifting Apparatus

According to another aspect of the disclosure, as represented in FIG. 2, there is provided a kit 600 for forming a lifting apparatus 100. For instance, the kit 600 comprises first and second lifting devices 200, 200' and a lifting beam 300. The kit 600 might further comprise first and second supplementary supporting bases 400, 400'.

The lifting apparatus 100 can thus further be easily adapted to different types and dimensions of heavy machineries to be lifted, by replacing one or more of its components. For instance, the first and second lifting devices 200, 200' might be adapted to receive and lift lifting beams 300 of different dimensions (for instance of different lengths considered along the longitudinal direction I).

Lifting Assembly

Figure 12:
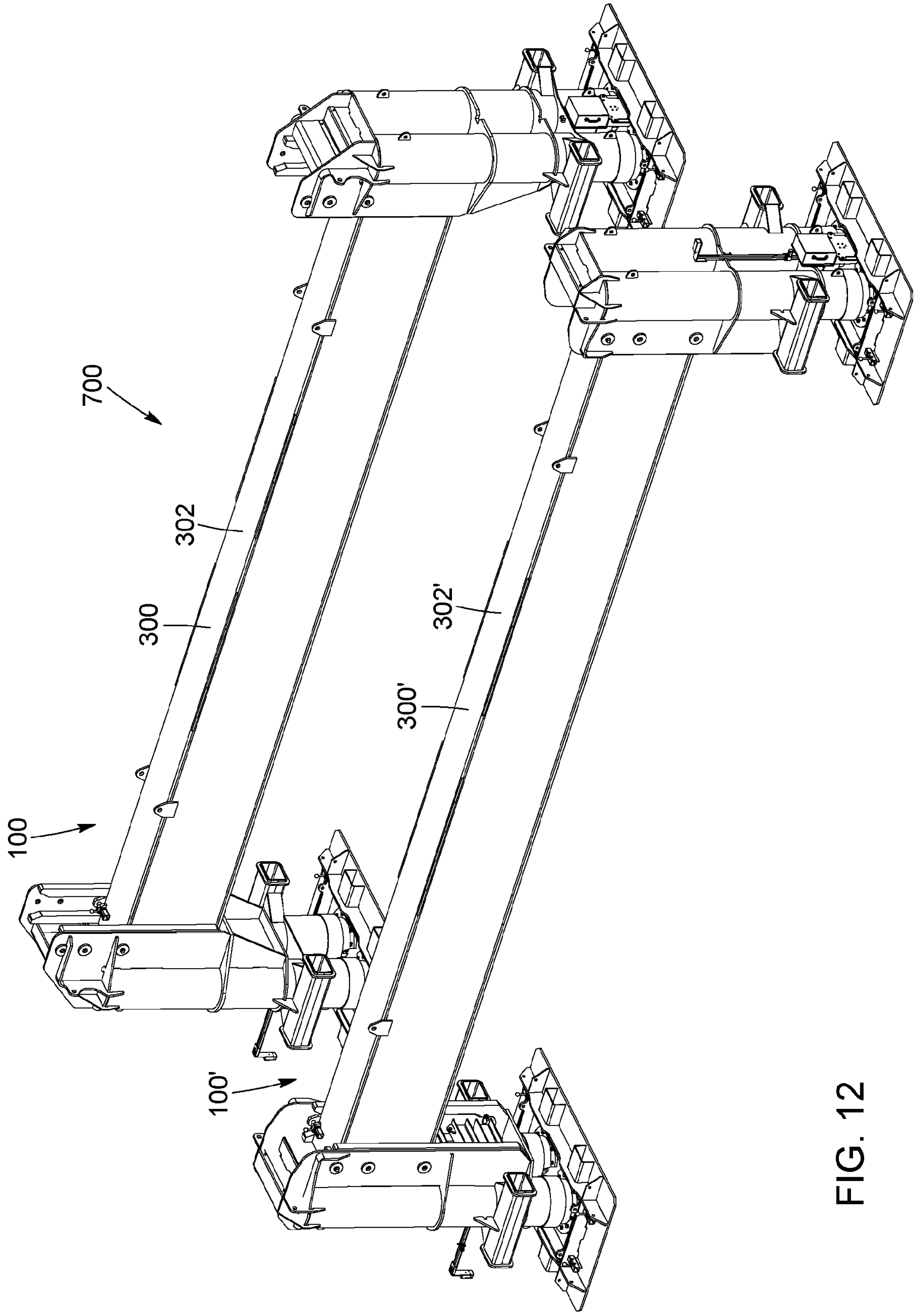
FIG. 12 is a top perspective view of a lifting assembly comprising first and second lifting apparatuses in accordance with an embodiment.

According to another aspect of the disclosure, as represented in FIG. 12, there is provided a lifting assembly 700 comprising first and second lifting apparatuses 100, 100' spaced apart from each other. In the embodiment shown, the first and second lifting apparatuses 100, 100' extend substantially parallel to each other (i.e. the longitudinal direction of their respective lifting beam 300, 300' are substantially parallel to each other.

The transverse lifting beam 300, 300' of each of the first and second lifting apparatuses 100, 100' comprises an upper surface 302, 302', the first and second lifting apparatuses 100, 100' being both configurable into a raised configuration wherein the upper surface 302 of the first lifting apparatus 300 is higher than the upper surface 302 of the second lifting apparatus 300'. The lifting assembly 700 is thus configured to lift and incline a heavy machinery (i.e. to configure the lifted heavy machinery into a substantially inclined configuration with regards to the ground surface).

As represented in the embodiment shown in FIG. 12, one of lifting apparatuses comprises spacers, for its upper surface to be at a height different from a height of the upper surface of the other lifting apparatus, when the lifting apparatuses are configured in the extended configuration.

A lifting assembly comprising more than two lifting apparatuses could also be conceived. It is thus understood that the shape, the configuration and the number of the lifting apparatuses can vary from the embodiment shown. Moreover, the lifting assembly can comprise either lifting apparatuses of a single embodiment or lifting apparatuses of different embodiments.

Method for Lifting Heavy Machinery from a Ground Surface

Figure 13:
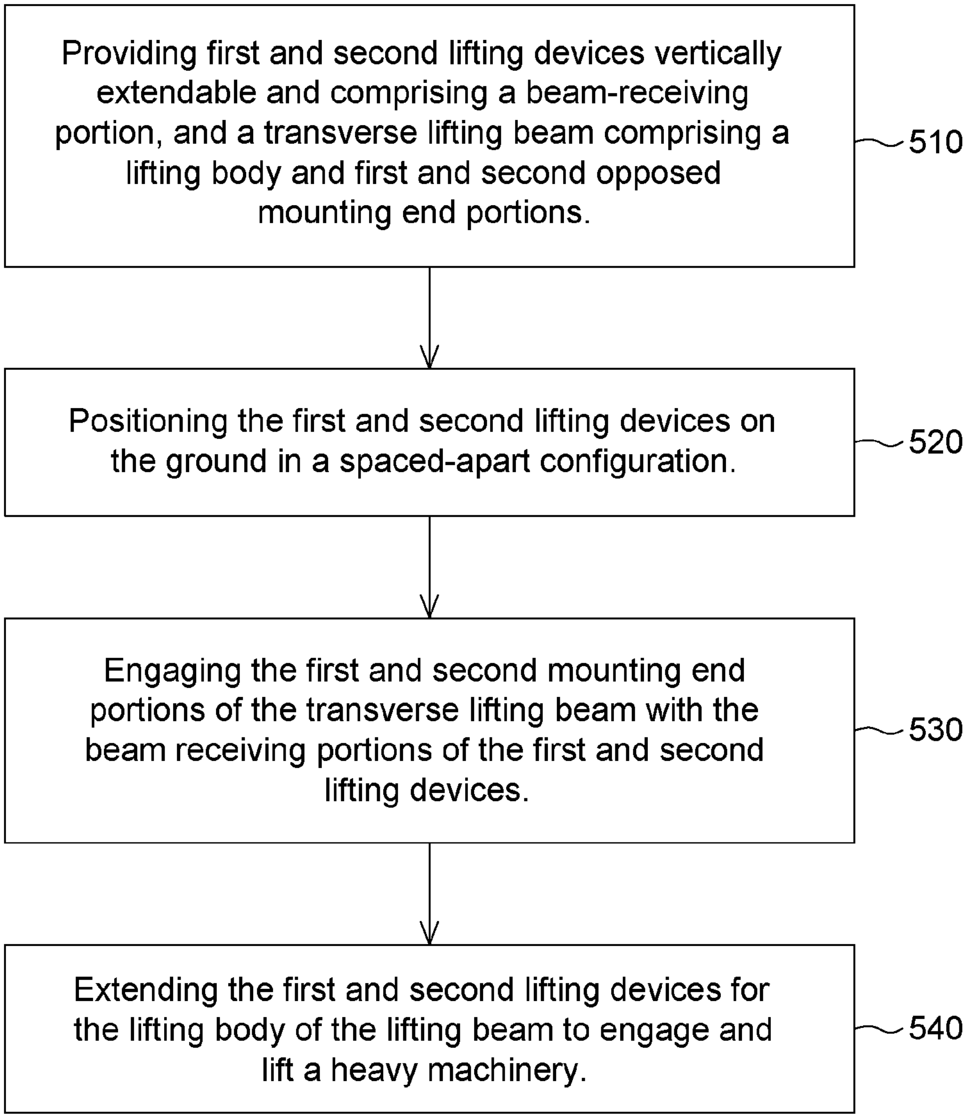
FIG. 13 is a block diagram representing sequential steps of a method for lifting heavy machinery from a ground surface.

According to another aspect of the disclosure, as represented in FIG. 13, there is provided a method 500 for lifting heavy machinery from a ground surface. The method 500 according to the present disclosure may be carried out with a lifting apparatus 100 as one of those described above.

The method 500 firstly comprises a step 510 of providing a kit 600 according to the present disclosure. For instance, the step 510 comprises providing first and second lifting devices vertically extendable and comprising a beam-receiving portion and a transverse lifting beam comprising a beam body and first and second opposed mounting end portions, wherein each beam-receiving portion comprises one of a male connector and a female connector and each of the first and second mounting end portions of the transverse lifting beam comprises the other one of a male connector and a female connector.

The method 500 then comprises the step 520 of positioning the first and second lifting devices on the ground in a spaced-apart configuration (for instance, positioning the first and second lifting devices on the ground surface at a distance from each other corresponding substantially to a length of the transverse lifting beam). The method 500 might further comprise the step 530 of engaging the first and second mounting end portions of the transverse lifting beam with the beam-receiving portions of the first and second lifting devices and the step 540 of extending the first and second lifting devices for the beam body of the lifting beam to engage and lift the heavy machinery (for instance by actuating hydraulic cylinders of the first and second lifting devices).

The method 500 might further comprise a step of providing first and second supplementary mounting bases; a step of positioning the first and second supplementary mounting bases on the ground surface; and a step of mounting the first and second lifting devices to the first and second supplementary mounting bases. For instance, the step of positioning the first and second supplementary mounting bases on the ground surface comprises positioning the first and second supplementary mounting bases on the ground surface at a distance from each other corresponding substantially to a length of the transverse lifting beam.

In the embodiment shown, the step of mounting the first and second lifting devices to the first and second supplementary mounting bases comprises engaging cylinder-receiving receptacles of the first and second lifting devices in a lifting device-receiving cavity formed by lifting device-receiving boxes of first and second supplementary mounting bases. The method may further comprise the step of securing lower portions of the first and second lifting devices to the first and second supplementary mounting bases.

In the embodiment shown, the step 530 comprises placing the transverse lifting beam between the first and second lifting devices and above upper portions of the first and second lifting devices. The step 530 further comprises engaging lower portions of the first and second mounting end portions to the beam-receiving portions and engaging the male and female connectors together. The lifting beam is thus downwardly translated (substantially vertically, in the embodiment shown), while maintaining in the embodiment shown lower abutting guides protruding from first and second side walls of the transverse lifting beam in beam engagement tracks of first and second beam supporting plates. Upper abutting guides of the first and second mounting end portions are thus sequentially also engaged in the corresponding beam engagement track via an open upper end thereof. The lifting beam is further lowered in the beam-receiving portions until the lower abutting guides abut against closed lower ends of the beam engagement tracks.

In the embodiment shown in which the beam engagement track has a decreasing cross-section from an upper section towards a lower section, the stability of the engagement and the fitting of the lower abutting guides in the closed lower ends is further improved.

It is understood that in the embodiment in which at least one of the above-described spacers 2020 is engaged in the beam-receiving portion 2250, the lifting beam 2300 will only be lowered in the beam-receiving portions 2250 until the lower abutting guides 2350 abut against the upper portion 2026 of the spacer 2020. As mentioned above, the upper portion 2026 of the spacer 2020 might thus have a shape conforming substantially to a shape of a lower portion of the mounting end portions 2320, 2330 of the transverse lifting beam 2300. In other words, the engagement of one or more spacers 2020 to the beam-receiving portion 2250 allows the adjustment of the vertical position of the transverse lifting beam with regards to the beam-receiving portions 2250 of the first and second lifting devices 2200, 2200'.

Figure 9:
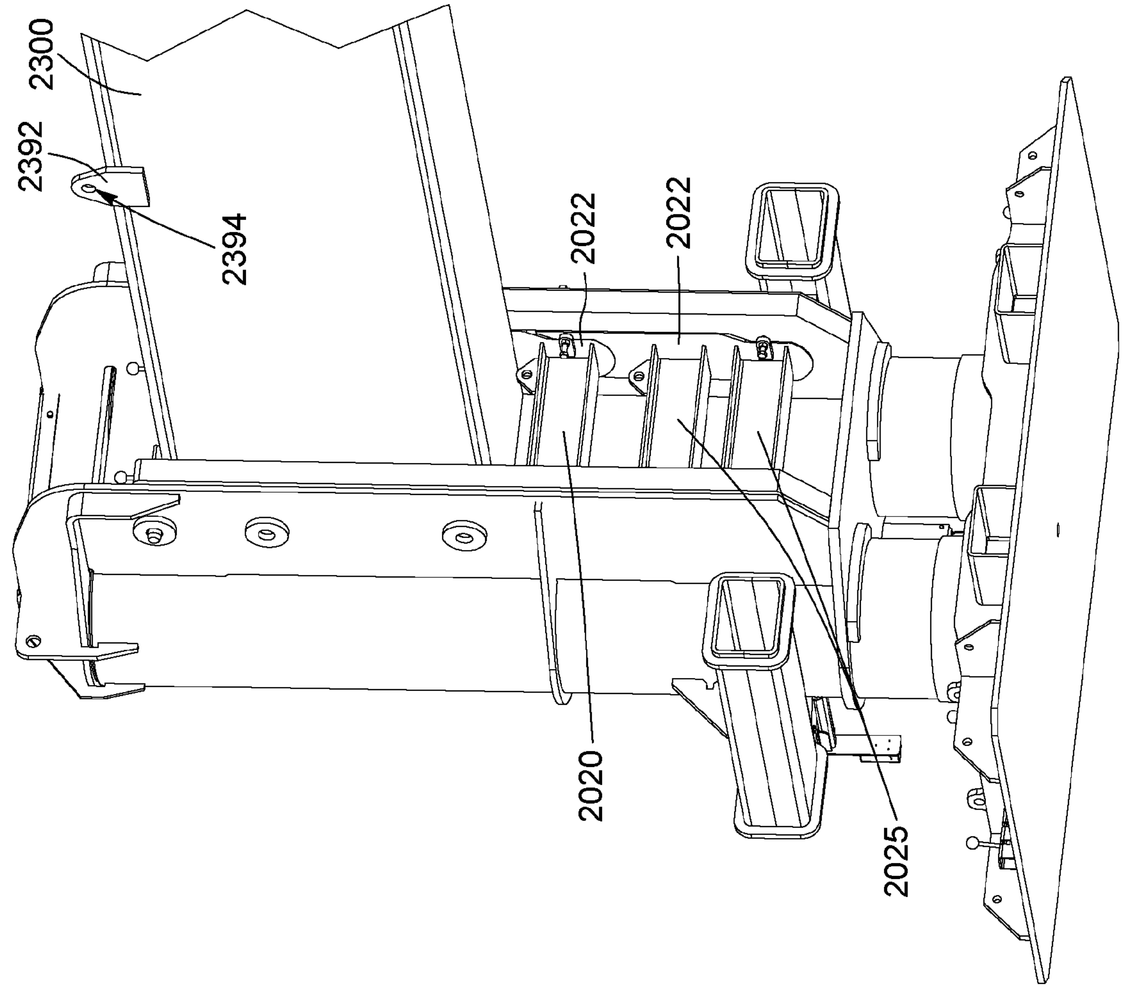
FIG. 9 is an enlarged perspective view of the first lifting device of the lifting apparatus of FIG. 8, with the mounting end portion of the lifting beam engaged therewith.

In other words, in one of the embodiments shown, the method 500 might further comprise a step of providing at least one spacer; a step of engaging the at least one spacer to the beam-receiving portion of at least one of the first and second lifting devices; and a step of abutting the corresponding one of the first and second mounting end portions against the at least one spacer The lifting beam 300 is then prevented from going lower by the lower abutting guides 350 abutting against the closed lower ends 272 (or against the spacers 2020, in the embodiment represented in FIG. 9). The lifting beam 300, 1300, 2300 is also prevented from pivoting with regards to the first and second lifting devices 200, 200', 1200, 1200', 2200, 2200' (thus limiting the risk of a fall and a disassembling of the lifting apparatus 100, 1100, 2100 by domino effect) by the engagement of the first and second bearing surfaces respectively with the lower and upper abutting guides and/or by the engagement of the male and female connectors.

The lifting apparatus 100, 1100, 2100 can thus be easily assembled. It is understood that the lifting apparatus 100, 1100, 2100 can also be easily disassembled by the above-described steps of the method 500 performed in a reverse order.

It is further understood that the lifting apparatus 100, 1100, 2100 according to the present disclosure can be easily transported, once at least partially disassembled. For instance and without being limitative, the disassembled lifting apparatus 100, 1100, 2100 can be transported with the first and second lifting devices 200, 200', 1200, 1200', 2200, 2200' and the lifting beam 300, 1300, 2300 extending substantially parallel to each other, so as to be less bulky than the lifting apparatus in an assembled configuration.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind. The scope of the invention is therefore intended to be limited by the scope of the appended claims.

The invention claimed is:

1. A lifting apparatus for lifting heavy machinery, the lifting apparatus comprising:

first and second lifting devices vertically extendable and spaced-apart from each other, each of the first and second lifting devices comprising a lower portion having a supporting base configured to be positioned on a ground surface, and a beam-receiving portion; and a transverse lifting beam comprising: a beam body engageable with a portion of the heavy machinery;

and first and second opposed mounting end portions removably engageable with the beam-receiving portions of the first and second lifting devices, for the transverse lifting beam to extend between said first and second lifting devices;

wherein each beam-receiving portion defines a beam-receiving cavity and comprises first and second spaced-apart beam-supporting plates partially delimiting the beam-receiving cavity and extending substantially parallel to each other, wherein each beam-receiving portion includes a beam engagement track defined in at least one of the first and second beam supporting plates of each beam-receiving portion, each of the first and second mounting end portions of the transverse lifting beam being removably engageable with the beam-receiving cavity of the corresponding beam-receiving portion and wherein the beam-receiving cavities of the first and second lifting devices substantially face each other;

wherein said at least one of the first and second beam-supporting plates comprises an inner face and first and second spaced-apart guiding rails protruding inwardly from the inner face, the beam engagement track being at least partially formed between the first and second guiding rails, and wherein said at least one of the first and second beam-supporting plates comprises a beam-bearing portion joining the first and second guiding rails at lower ends thereof.

2. The lifting apparatus according to claim 1, wherein the beam engagement track has a beam-introducing portion and a seat portion, and wherein the beam engagement track has a width, the width decreasing from the beam-introducing portion towards the seat portion.

3. The lifting apparatus according to claim 1, wherein each of the first and second mounting end portions of the transverse lifting beam comprises upper and lower abutting fingers protruding outwardly from first and second side walls of the transverse lifting beam and removably engageable with the beam engagement track of the corresponding beam-receiving portion, and wherein the lower abutting finger is abuttable against the seat portion of the beam engagement track.

4. The lifting apparatus according to claim 3, wherein the lower abutting finger has a substantially oval cross-section, and the upper abutting finger has a substantially rectangular cross-section.

5. The lifting apparatus according to claim 1, wherein at least one of the first and second lifting devices comprises at least one spacer removably engageable with the beam-receiving portion and extending between the first and second beam-supporting plates and wherein said at least one spacer comprises at least one track-engaging end removably engageable with the beam engagement track of said at least one of the first and second beam-supporting plates.

6. A method for assembling a lift for heavy machinery, the method comprising:

providing the lifting apparatus according to claim 1;

positioning the supporting bases of the first and second lifting devices on a ground in a spaced-apart configuration, so that the first and second lifting devices extend vertically in a spaced-apart configuration; and engaging the first and second mounting end portions of the transverse lifting beam with the beam engagement tracks of the beam-receiving portions of the first and second lifting devices.

7. A lifting apparatus for lifting heavy machinery, the lifting apparatus comprising:

first and second lifting devices vertically extendable and spaced-apart from each other, each of the first and second lifting devices comprising a lower portion having a supporting base configured to be positioned on a ground surface, and a beam-receiving portion, wherein each beam-receiving portion defines a beam-receiving cavity, each beam-receiving portion comprising first and second spaced-apart beam-supporting plates partially delimiting the beam-receiving cavity, at least one of the first and second beam-supporting plates of each beam-receiving portion defining a beam engagement track having a beam-introducing portion and a seat portion, wherein the beam engagement track has a width, the width decreasing from the beam-introducing portion towards the seat portion; and a transverse lifting beam comprising:

a beam body engageable with a portion of the heavy machinery; and first and second opposed mounting end portions removably engageable with the beam-receiving cavity of the corresponding beam-receiving portions of the first and second lifting devices, for the transverse lifting beam to extend between said first and second lifting devices;

wherein each of the first and second mounting end portions comprises at least two vertically spaced-apart abutting portions detachably engageable with the corresponding beam-receiving portion when mounted thereto.

8. The lifting apparatus according to claim 7, wherein said at least one of the first and second beam-supporting plates comprises an inner face and first and second spaced-apart guiding rails protruding inwardly from the inner face, the beam engagement track being at least partially formed between the first and second guiding rails and wherein said at least one of the first and second beam-supporting plates comprises a beam-bearing portion joining the first and second guiding rails at lower ends thereof.

9. The lifting apparatus according to claim 7, wherein each of the first and second mounting end portions of the transverse lifting beam comprises upper and lower abutting fingers protruding outwardly from first and second side walls of the transverse lifting beam and removably engageable with the beam engagement track of the corresponding beam-receiving portion, said at least two vertically spaced-apart abutting portions comprising said upper and lower abutting fingers, wherein the lower abutting finger is abuttable against the seat portion of the beam engagement track, wherein each of the first and second beam-supporting plates of each beam-receiving portion comprises a respective one of the beam engagement tracks, and wherein each of the first and second mounting end portions comprises first and second lower abutting fingers protruding outwardly from the first and second side walls and being engageable with the corresponding one of the beam engagement tracks and wherein each of the first and second mounting end portions comprises first and second upper abutting fingers protruding outwardly from the first and second side walls and being engageable with the corresponding one of the beam engagement tracks of the first and second beam-supporting plates of the corresponding beam-receiving portion.

10. The lifting apparatus according to claim 7, wherein each of the first and second mounting end portions comprises a blocker configured to block together the corresponding one of the first and second mounting end portions and the corresponding beam-receiving portion.

11. The lifting apparatus according to claim 7, wherein each of the first and second lifting devices comprises at least one hydraulic cylinder, the lifting apparatus further comprising at least one controller configured to simultaneously extend or retract the at least one hydraulic cylinder of each of the first and second lifting devices.

12. The lifting apparatus according claim 11, wherein said at least one hydraulic cylinder of each of the first and second lifting devices comprises a cylinder lower end portion, wherein the supporting base of each of the first and second lifting devices defines a cylinder-receiving receptacle for the corresponding cylinder lower end portion to be engaged therewith, the lifting apparatus further comprising first and second supplementary mounting bases securable to the corresponding lower portion.

13. A lifting apparatus for lifting heavy machinery, the lifting apparatus comprising:

first and second lifting devices vertically extendable and spaced-apart from each other, each of the first and second lifting devices comprising a lower portion having a supporting base configured to be positioned on a ground surface, and a beam-receiving portion engageable with the lower portion and vertically translatable with respect to the lower portion, wherein each beam-receiving portion defines a beam-receiving cavity, wherein each beam-receiving portion comprises first and second spaced-apart beam-supporting plates partially delimiting the beam-receiving cavity and wherein at least one of the first and second beam-supporting plates of each beam-receiving portion comprises at least two spaced-apart bearing surfaces and a beam engagement track at least partially delimited by said at least two spaced-apart bearing surfaces; and a transverse lifting beam comprising:

a beam body engageable with a portion of the heavy machinery; and first and second opposed mounting end portions removably engageable with the beam-receiving cavity of the corresponding beam-receiving portion, for the transverse lifting beam to extend between said first and second lifting devices;

wherein the first and second mounting end portions of the transverse lifting beam being engageable with the corresponding one of the at least two spaced-apart bearing surfaces to prevent each of the first and second mounting end portions from tilting with respect to the corresponding one of the first and second lifting devices when mounted thereto.

14. The lifting apparatus according to claim 13, wherein the beam engagement track has a beam-introducing portion and a seat portion and wherein the beam engagement track has a width, the width decreasing from the beam-introducing portion towards the seat portion.

* * * * *